United States Patent [19]
Shikama et al.

[11] Patent Number: 5,634,704
[45] Date of Patent: Jun. 3, 1997

[54] LIGHT-SOURCE DEVICE AND PROJECTION-TYPE DISPLAY DEVICE

[75] Inventors: Shinsuke Shikama; Hiroshi Kida, both of Nagaokakyo, Japan

[73] Assignee: Mitsubishi Denki Kabushiki Kaisha, Tokyo, Japan

[21] Appl. No.: 239,688

[22] Filed: May 9, 1994

[30] Foreign Application Priority Data

| May 31, 1993 | [JP] | Japan | 5-128892 |
| May 31, 1993 | [JP] | Japan | 5-128893 |
| May 19, 1993 | [JP] | Japan | 5-117073 |
| Nov. 12, 1993 | [JP] | Japan | 5-283381 |

[51] Int. Cl.[6] .................................................. G03B 21/14
[52] U.S. Cl. ............................ 353/31; 353/102; 362/32
[58] Field of Search ............................ 353/31, 33, 34, 353/37, 38, 102; 362/307, 308, 311, 326, 327, 328, 339, 268, 32

[56] References Cited

U.S. PATENT DOCUMENTS

| 3,600,568 | 8/1971 | Weyrauch | 353/102 |
| 4,787,013 | 11/1988 | Sugino et al. | 362/32 |
| 4,918,583 | 4/1990 | Kudo et al. | 362/32 |
| 4,998,191 | 3/1991 | Tejima et al. | 362/268 |
| 5,098,184 | 3/1992 | van den Brandte et al. | 353/102 |
| 5,142,387 | 8/1992 | Shikama et al. | 353/122 |

FOREIGN PATENT DOCUMENTS

| 64-49017 | 2/1989 | Japan . | |
| 0180829 | 8/1991 | Japan | 353/102 |
| 3-293614 | 12/1991 | Japan . | |

*Primary Examiner*—William Dowling

[57] ABSTRACT

A projection-type display device comprises a pillar optical element having an injection end and an emitting end, a lamp, an elliptical mirror for condensing light emitted by the lamp in the vicinity of the injection end, a first lens for forming an image of the emitting end, a light valve for forming a picture image on a surface having an image display area, and a projection lens. The image of the emitting end of the pillar optical element is projected by the first lens on the image display area within the surface of the light valve. The projection lens magnifies and projects the picture image displayed by the light valve on the screen.

47 Claims, 24 Drawing Sheets

5,634,704

LIGHT-SOURCE DEVICE AND PROJECTION-TYPE DISPLAY DEVICE

BACKGROUND OF THE INVENTION

The present invention relates to a light-source device capable of illuminating the desired area to be illuminated with high illuminance and further capable of achieving high uniformity of illuminance.

The present invention also relates to a projection-type display device incorporating the light-source device and, more precisely, to a projection-type display device the projected picture image from which is of high brightness and low in the nonuniformity of brightness.

FIG. 27 is a structural drawing showing the general structure of the optical system of a projection-type display device 40 and a light-source device 10 according to prior art.

As is shown in the drawing, conventional light-source device 10 comprises a lamp 21, an elliptical mirror 22 of which the reflecting surface is an elliptical surface that is rotationally symmetrical with respect to optical axis AX, and a condenser lens 23. Lamp 21 is so disposed that its center of emission is located in the vicinity of a first focal point $FP_1$ of the elliptical mirror 22. Thus light $L_1$ emitted by the lamp 21 and reflected by the elliptical mirror 22 is condensed at a convergence point CP in the vicinity of a second focal point $FP_2$ of the elliptical mirror 22, forming an image of the lamp 21. Further, the condenser lens 23 is so disposed that the position of the focal point on its front side (considering, here and hereafter in these specifications, the lamp 21 side as the front, or forward, side and the screen SC side as the rear, or rearward, side) coincides with the convergence point CP. Thus light $L_1$ passing through the convergence point CP and impinging on the condenser lens 23 becomes a parallel luminous flux $L_2$ illuminating the surface to be illuminated (in this case liquid crystal panel 61).

Conventional projection-type display device 40 further comprises, in addition to the light-source device 10, a liquid crystal panel 61 that functions as a light valve, and a projector lens 62. Note that, in the drawing, SC designates the screen on which the picture image is projected.

The liquid crystal panel 61 comprises an image display area for the display of a picture image based on electrical signals from a driver circuit (not shown), the optical transmittance of which varies in accordance with the density and color of the picture image displayed. The luminous flux $L_3$ that has passed through the liquid crystal panel 61 then passes through the projector lens 62, becomes projected light $L_4$, and is projected onto the screen SC.

FIG. 28 is a structural drawing showing the general structure of the optical system of a projection-type display device 41 capable of magnifying and displaying a color picture image according to prior art.

The projection-type display device 41 comprises, in addition to the light-source device 10 of the same structure as shown in FIG. 27, a dichroic mirror 63R for color separation that reflects only red light $L_r$ and transmits other color components, a dichroic mirror 63B for color separation that reflects only blue light $L_b$ and transmits other color components, and light-reflecting mirrors 64R and 64G. Further, the projection-type display device 41 comprises a dichroic mirror 66B for color synthesis that reflects only blue light $L_b$ and transmits other color components, a dichroic mirror 66G for color synthesis that reflects only green light $L_g$ and transmits other color components, liquid crystal panels 61R, 61G, and 61B, field lenses 65R, 65G and 65B, and a projector lens 62.

In the projection-type display device 41, the red component $L_r$ of luminous flux $L_2$ emitted from the light-source device 10 is reflected by the dichroic mirror 63R, its direction is changed by the mirror 64R, passes through the liquid crystal panel 61R and the field lens 65R, and then passes through the dichroic mirrors 66B and 66G and impinges on the projector lens 62. The blue component $L_b$ passes through the dichroic mirror 63R, is reflected by the dichroic mirror 63B, passes through the liquid crystal panel 61B and the field lens 65B, is reflected by the dichroic mirror 66B, passes through the dichroic mirror 66G and impinges oil the projector lens 62. The green component $L_g$ passes through the dichroic mirrors 63R and (63B, passes through the liquid crystal panel 61G and the field lens 65G, its direction is changed by the mirror 64G, is reflected by the dichroic mirror 66G, and impinges on the projector lens 62.

Nevertheless, a problem arises in that, while the cross-sectional configuration of luminous flux $L_2$ emitted by the light-source device 10 above described is circular, the image display area of the liquid crystal panel 61 is generally rectangular, so that, as shown in FIG. 29, it is necessary for the diameter of luminous flux $L_2$ to be greater than the diagonal dimension of rectangular image display area 70, with the result that, since the light impinging on the cross-hatched portion is wasted, the luminous energy passing through the image display area 70 and impinging on the projector lens 62 is reduced and it becomes difficult to increase the brightness of the projected image.

A further problem arises in that, since the luminous intensity of the lamp 21 generally varies in accordance with the direction of emission, luminous flux $L_2$ emitted from the light-source device 10 is not uniform, giving rise to non-uniformities in the brightness of the projected image. As shown, for example, in FIG. 27 and FIG. 28, when the lamp 21 is a discharge lamp having its discharge electrode disposed parallel to optical axis AX, the luminous intensity in the direction of optical axis AX is small, with the result that the brightness near the center of the projected image is low.

SUMMARY OF THE INVENTION

Thus it is an object of the present invention to provide a light-source device capable of illuminating the desired area to be illuminated with high illuminance, and with highly uniform illuminance.

Further, it is another object of the present invention to provide a projection-type display device having a projected image of high brightness and low nonuniformity of brightness.

According to one aspect of the present invention, a light-source device comprises: a pillar-shaped optical element (hereinafter abbreviated to "a pillar optical element") having an injection end and an emitting end; a lamp; condensing mirror for condensing light emitted by the lamp in the vicinity of the injection end of the pillar optical element; and first lens for forming an image of the emitting end; wherein the image of the emitting end of the pillar optical element is formed by the first lens on a surface to be illuminated. In this light-source device, the light impinging on the pillar optical element is totally reflected from the side surfaces of the pillar optical element providing illumination of the emitting end so that the uniformity of illuminance of the emitting end is increased. It is also possible, by providing illumination only to an area that is slightly larger than the area to be illuminated, to illuminate the desired area to he illuminated with high illuminance.

According to another aspect of the present invention, a projection-type display device comprises: a pillar optical element having an injection end and an emitting end; a lamp; condensing mirror for condensing light emitted by the lamp in the vicinity of the injection end; a first lens for forming an image of the emitting end; a light valve for forming a picture image on a surface having an image display area; and a projection lens for magnifying and projecting the picture image displayed by the light valve; wherein the image of the emitting end is projected by the first lens on the image display area within the surface of the light valve. In this projection-type display device, the light impinging on the pillar optical element is totally reflected from the side surfaces of the pillar optical element providing illumination of the emitting end so that the uniformity of illuminance of the emitting end is increased and the nonuniformity in the brightness of the projected image is reduced. It is also possible, by providing illumination only to an area that is slightly larger than the image display area of the light valve, to increase the brightness of the projected image.

According to yet another aspect of the present invention, a projection-type display device comprises: a pillar optical element having an injection end and an emitting end; a lamp; a condensing mirror for condensing light emitted by the lamp; a first lens for forming an image of the emitting end; analysing mirrors for analysing, into a red component, a green component and a blue component, the light that has been emitted from the emitting end and has passed through the first lens; a first light valve for forming a picture image for the red component light on a surface having a first image display area; a second light valve for forming a picture image for the green component light on a surface having a second image display area; a third light valve for forming a picture image for the blue component light on a surface having a third display area; synthesizing mirrors for superimposing the red component light, green component light and blue component light that has passed through the first through third tight valves, respectively; and a projection lens for magnifying and projecting the displayed picture image synthesized by the synthesizing means from the first through third light valves.

According to yet another aspect of the present invention, a light-source device comprises: a pillar optical element having an injection end and an emitting end; a lamp; a condensing mirror for condensing the light emitted by the lamp; a cone-shaped deflection element for deflecting luminous flux from the condensing mirror and injecting the luminous flux to the injection end; and first lens for forming an image on the emitting end; wherein the cone-shaped deflection element is disposed in the vicinity of a convergence point of the luminous flux condensed by the condensing mirror, wherein in that the injection end is disposed immediately to the rear of the cone-shaped deflection means, and wherein the image of the emitting end is formed by the first lens on a surface to be illuminated. In this light-source device, the luminous flux in the axial direction of a lamp emitting low luminous energy is increased by a cone-shaped deflection means, so that even if the number of imaginary light sources caused by the total reflection at the sides of the pillar optical element is reduced, the uniformity of illuminance at the emitting end of the pillar optical element is increased. It is also possible, by providing illumination only to an area that is slightly larger than the area to be illuminated, to illuminate the area that it is desired to illuminate with high illuminance.

According to yet another aspect of the present invention, a projection-type display device comprises: a pillar optical element having an injection end and an emitting end; a lamp; a condensing mirror for condensing light emitted by the lamp; a cone-shaped deflecting element for deflecting luminous flux from the condensing mirror and injecting the luminous flux into the injection end; a first lens for forming an image on the emitting end; a light valve for forming a picture image on a surface having an image display area; and a projection lens for magnifying and projecting the picture image displayed by the light valve; wherein the image of the emitting end is formed by means of the first lens means on the image display area. In this light-source device, the luminous flux in the axial direction of a lamp emitting low luminous energy is increased by the cone-shaped deflection element, so that even if the number of imaginary light sources caused by the total reflection at the sides of the pillar optical element is reduced, the uniformity of illuminance at the emitting end of the pillar optical element is increased. It is also possible, by providing illumination only to an area that is slightly larger than the area to be illuminated, to illuminate the area that it is desired to illuminate with high illuminance.

According to yet another aspect of the present invention, a projection-type display device comprises: a pillar optical element having an injection end and an emitting end: a lamp; a condensing element for condensing light emitted by the lamp in the vicinity of the injection end; a cone-shaped deflection element for deflecting the luminous flux from the condensing mirror and injecting the luminous flux into the injection end; a first lens for forming an image on the emitting end; a analysing mirrors for analysing, into a red component, a green component and a blue component, the light that has been emitted from the emitting end of the pillar optical element and has passed through the first lens; a first light valve for forming a picture image for the red component light on a first image display area; a second light valve for forming a picture image for the green component light on a second image display area; a third light valve for forming a picture image for the blue component light on a third image display area; synthesizing mirrors for superimposing the red component light, green component light and blue component light that has passed the first through third light valves, respectively; and a projection lens for magnifying and projecting the displayed picture image synthesized by the synthesizing means from the first through third light valves.

According to yet another aspect of the present invention, a light-source device comprises: a pillar optical element having an injection end and an emitting end; a lamp; a condensing mirror for condensing light emitted by the lamp; and first lens means for forming an image of the emitting end; wherein the pillar optical element has the injection end that is cone-shaped and the emitting end that is planar, and that the injection end of the pillar optical element is disposed in the vicinity of the convergence point of the luminous flux condensed by the condensing mirror so that the image on the emitting end of the pillar optical element is formed by the first lens on a surface to be illuminated. In this light-source device, the luminous flux in the axial direction of the lamp emitting low luminous energy is increased by a pillar optical element having a cone-shaped injection end, so that even if the number of imaginary light sources caused by the total reflection at the sides of the pillar optical element is reduced, the uniformity of illuminance at the emitting end of the pillar optical element is increased. It is also possible, by providing illumination only to an area that is slightly larger than the area to be illuminated, to illuminate the desired area to be illuminated with high illuminance.

According to yet another aspect of the present invention, a projection-type display device comprises: a pillar optical element having an injection end and an emitting end; a lamp; a condensing mirror for condensing light emitted by the lamp; a first lens for forms an image on the emitting end; a light valve for forming a picture image on a surface having an image display area; and a projection lens for magnifying and projecting the picture image displayed by the light valve; wherein the pillar optical element has an injection end that is cone-shaped and the emitting end that is planar, and the injection end of the pillar optical element is disposed in the vicinity of a convergence point of the luminous flux condensed by the condensing mirror so that the image on the emitting end of the pillar optical element is formed by the first lens means in the image display area of the light valve. In this projection-type display device, the luminous flux in the axial direction of a lamp emitting low luminous energy is increased by the pillar optical element having the cone-shaped injection end, so that the uniformity of illuminance of the emitting end of the pillar optical optical element is increased and the nonuniformity of brightness of the projected image is decreased. It is also possible, by providing illumination only to an area that is slightly larger than the image display area of the light valve, to Increase the brightness of the projected image.

According to yet another aspect of the present invention, a projection-type display device comprises: a pillar optical element having an injection end and an emitting end; a lamp; a condensing mirror for condensing light emitted by the lamp in the vicinity of the injection end of the pillar optical element; a first lens for forming an image on the emitting end of the pillar optical element; analysing mirrors for analysing, into a red component, a green component and a blue component, the light that has been emitted from the emitting end of the pillar optical element and has passed through the first lens; a first light valve for forming a picture image for the red component light on a surface having a first image display area; a second light valve for forming a picture image for the green component light on a surface having a second image display area; a third light valve for forming a picture image for the blue component light on a surface having a third image display area; synthesizing mirrors for superimposing the red component light, green component light and blue component light that has passed the first through third light valves, respectively; and a projection lens for magnifying and projecting the displayed picture image synthesized by the synthesizing mirrors from the first through third light valves; wherein the pillar optical element has the injection end that is cone-shaped and the emitting end that is planar, and that the injection end of the pillar optical element is disposed in the vicinity of a convergence point of the luminous flux condensed by the condensing means so that the image on the emitting end of the pillar optical element is formed by the first lens in the image display area within the surface of the light valve.

According to yet another aspect of the present invention, a light-source device comprises: a pillar optical clement having an injection end and an emitting end; a lamp; a condensing mirror for condensing the light emitted by the lamp; a first lens for forming an image on the emitting end of the pillar optical element; a light valve for forming a picture image on a surface comprising an image display area; and a projection lens for projecting and magnifying the image displayed by the light valve; wherein the pillar optical element comprises a plurality of pillar optical elements having emitting ends of various configurations, with a switching mechanism so that the desired pillar optical element may be disposed in the optical path in accordance with the image display area of the light valve. In this projection-type display device, the cross sectional configuration of the luminous flux impinging on the light valve can be switched in accordance with the configuration of the image display area of the light valve by switching pillar optical elements, thereby reducing the amount of wasted luminous flux that makes no contribution to projecting the image.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

First Embodiment

Figure 1:
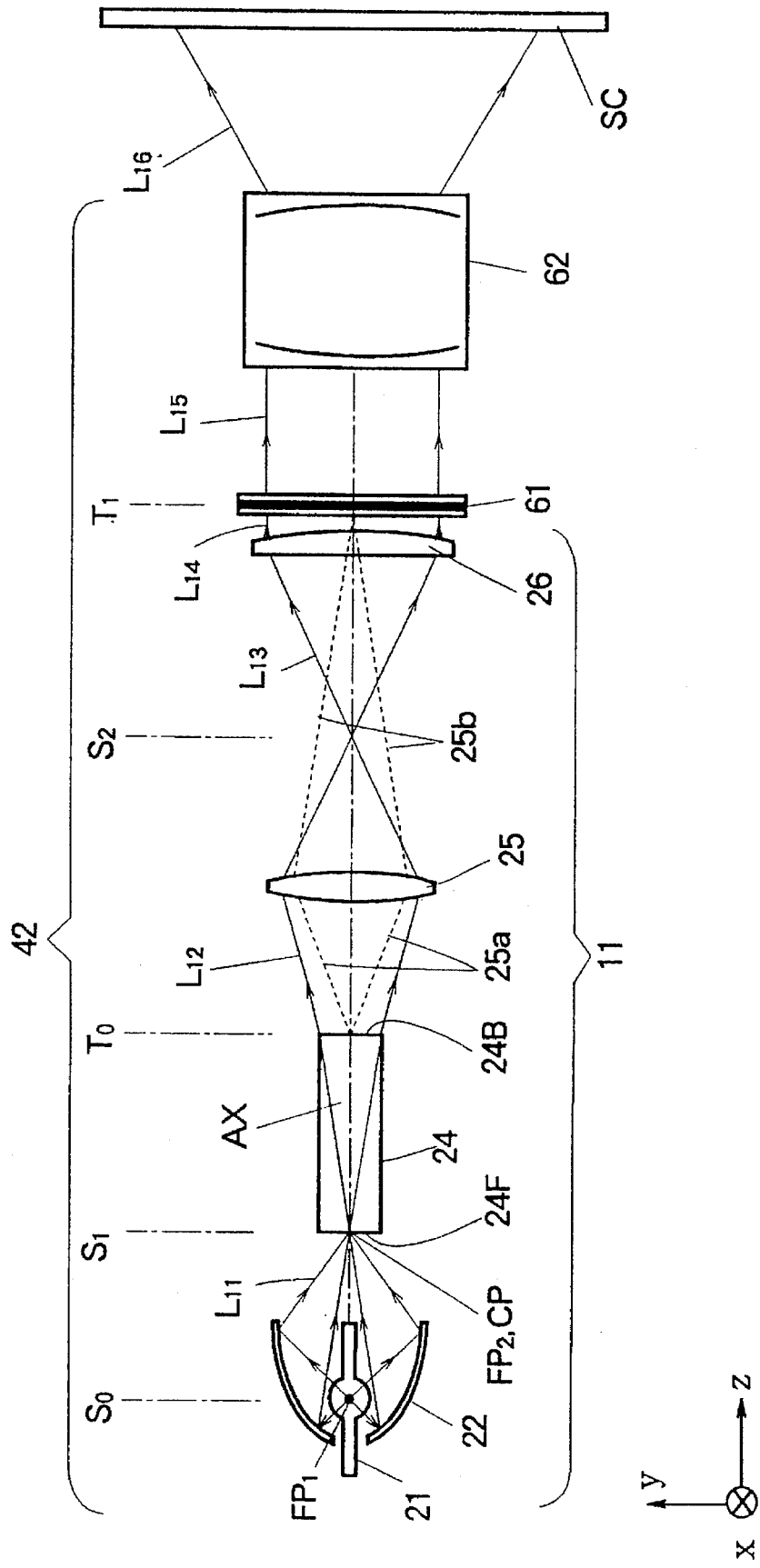
FIG. 1 is a structural drawing showing the general structure of the optical system of a light-source device 11 according to a first embodiment and of a projection-type display device 42 according to a second embodiment.
Figure 2:
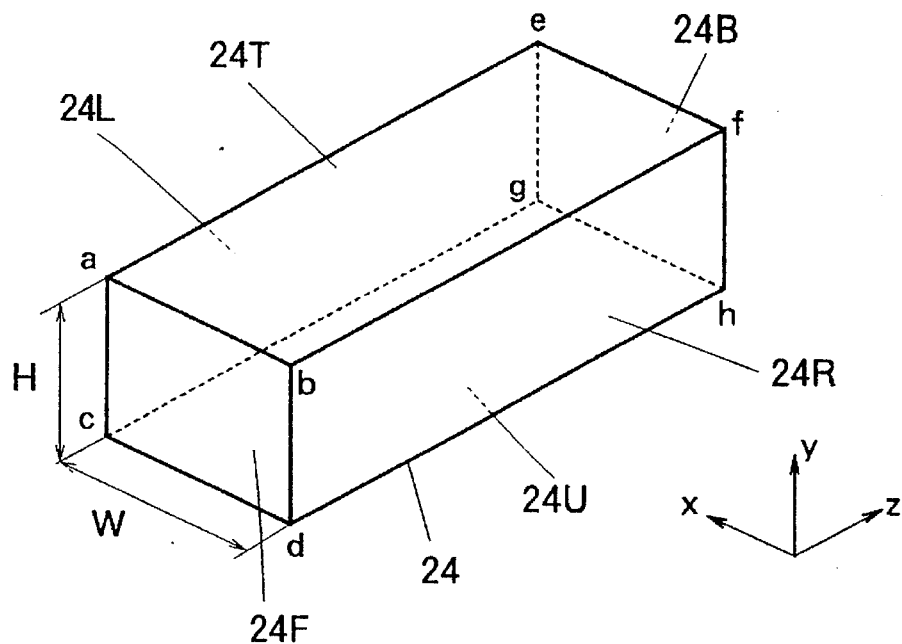
FIG. 2 is a perspective view showing the structure of a rod integrator according to the first embodiment.
Figure 3:
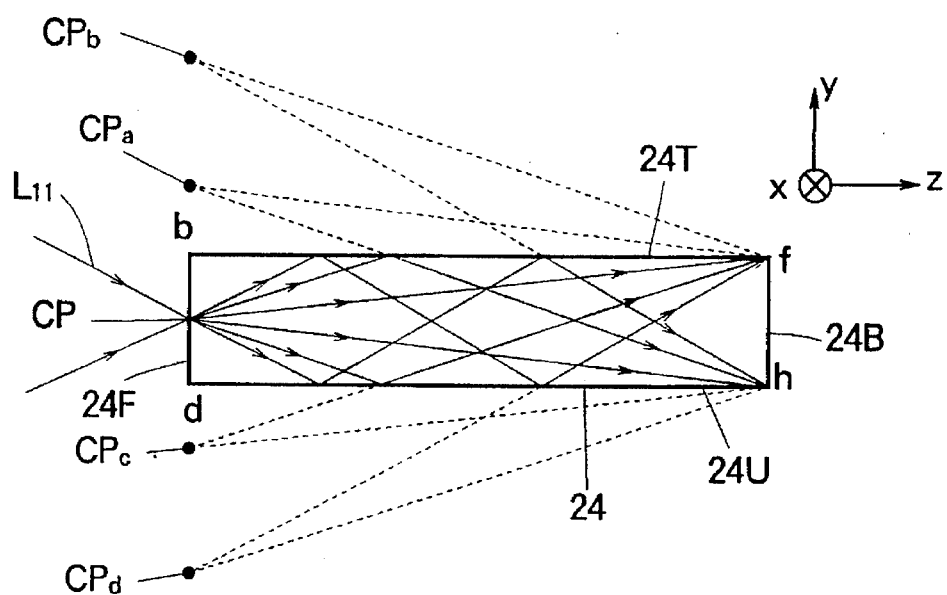
FIG. 3 is an explanatory drawing for the purpose of explaining the functions of the rod integrator according to the first embodiment.

The following is an explanation, based on FIG. 1 through FIG. 3, of a light-source device 11 according to a first embodiment.

FIG. 1 is a structural drawing showing the general structure of the optical system of the light-source device 11 according to the first embodiment and of a projection-type display device 42 incorporating this light-source device 11.

As is shown in the drawing, the light-source device 11 of the first embodiment comprises a lamp 21, an elliptical mirror 22, of which the reflecting surface is an elliptical surface that is rotationally symmetrical with respect to optical axis AX, a rod integrator 24 which is a transparent optical element, a relay lens 25, and a field lens 26.

The lamp 21 may be a discharge lamp such as a metal halide lamp and a xenon lamp, or a halogen lamp or the like. The lamp 21 is so disposed that its center of emission is located in the vicinity of a first focal point $FP_1$ of the elliptical mirror 22. Thus luminous flux $L_{11}$ emitted by the lamp 21 and reflected by the elliptical mirror 22 is condensed at the convergence point CP in the vicinity of a second focal point $FP_2$ of the elliptical mirror 22, forming an image of the lamp 21.

The rod integrator 24 is so disposed that its injection end 24F is positioned in the vicinity of the convergence point CP, and light passing through the rod integrator 24 is emitted from the emitting end 24B as luminous flux $L_{12}$.

The relay lens 25 is so disposed that the image from the emitting end 24B of the rod integrator 24 is formed on the surface to be illuminated (in this case, the liquid-crystal panel 61). The conjugate relationship of the relay lens 25 at this time is shown by broken lines 25a and 25b in FIG. 1. The light proceeding rearward from the convergence point CP (to the right in FIG. 1) due to the elliptical mirror 22 passes first through the rod integrator 24 and then, as luminous flux $L_{12}$, through the relay lens 25, forming a secondary light-source image on plane $S_2$ to the front of the liquid-crystal panel 61.

The field lens 26 is disposed in the vicinity of the liquid-crystal panel 61, which is the surface to be illuminated, so that its focal point is positioned in the vicinity of plane $S_2$ where the secondary light-source image is formed. Through the action of the field lens 26, luminous flux $L_{13}$ is converted into parallel luminous flux $L_{14}$, and illuminates the liquid-crystal panel 61, which is the surface to be illuminated.

Since the field lens 26 is disposed in the vicinity of the the liquid-crystal panel 61 which is the surface to be illuminated, it has virtually no effect on the conjugate relationship of the relay lens 25, shown by broken lines 25a and 25b. Thus light-emitting plane $S_0$ of the lamp 21 and second focal point plane $S_1$ of the elliptical mirror 22 and plane $S_2$ rearward of the relay lens 25 are mutually conjugate planes, and the image of the lamp 21 is formed on second focal point plane $S_1$ and plane $S_2$. Surface $T_1$ to be illuminated and surface $T_0$, which includes emitting end 24B of the rod integrator 24, are also conjugate, and luminous flux $L_{14}$, which has a cross sectional configuration analogous to that of the emitting end 24B, impinges on surface $T_1$ to be illuminated.

FIG. 2 is a perspective view showing the rod integrator 24 according to the first embodiment. As is shown in the drawing, the rod integrator 24 is a rectangular pillar optical element formed from a glass or plastic material that is transparent to light of the wavelengths used for illumination. The rod integrator 24 comprises an injection end 24F, an emitting end 24B, and a top side surface 24T, a bottom side surface 24U, a right; side surface 24R and a left side surface 24L. The side surfaces 24L, 24R, 24T and 24U are provided with a mirror finish to render them totally reflective. To increase the luminous energy, it is desirable that the injection end 24F and the emitting end 24B be provided with a non-reflective coating consisting of a film of dielectric material.

FIG. 3 is an explanatory drawing for the purpose of explaining the functions of the rod integrator 24. To simplify the explanation, only the luminous flux within cross-section y-z is shown in the drawing. Incident luminous flux $L_{11}$ reaches the emitting end 24B either after being totally reflected from the side surfaces 24T, 24U, 24R and 24L (of which only the top side surface 24T and the bottom side surface 24U are shown in FIG. 3), or without total reflection from the side surfaces. The luminous flux that is totally reflected from the side surfaces 24T and 24U, like the luminous flux emitted by imaginary light-source points ($CP_a$, $CP_b$, $CP_c$ and $CP_d$ in FIG. 3) within the plane including the injection end 24F, provides superimposed illumination of the emitting end 24B in accordance with the positional relationship among the totally reflective side surfaces. Since the emitting end 24B thus receives superimposed illumination from a plurality of imaginary light-source points, there is good uniformity of illumination within the emitting end 24B.

Further, as shown in FIG. 2, if we let the height dimensions of the emitting end 24B and of the injection end 24F be designated H and their width dimensions be designated W, it is desirable for the aspect ratio (width-to-height ratio) of the image display area of the liquid-crystal panel 61, which is the surface to be illuminated to be virtually identical to that of the emitting end 24B. This is because the cross-sectional configuration of luminous flux $L_{14}$ that illuminates surface to be illuminated $T_1$ in FIG. 1 is made into a conjugate image analogous to the emitting end 24B by the relay lens 25. In a case, for example, in which the surface to be illuminated is the liquid-crystal panel 61 and the aspect ratio of the image display area of the liquid-crystal panel 61 is 4:3, making the aspect ratio of the emitting end 24B also to be 4:3 will optimize illumination efficiency. Again, in a case in which the aspect ratio of the image display area of the liquid-crystal panel 61 is 16:9, making the aspect ratio of the emitting end 24B also to be 16:9 will optimize illumination efficiency.

As has been shown, the light-source device 11 according to this first embodiment makes possible illumination of the desired area to be illuminated with high illuminance. Further, by means of the light-source device 11, it is possible to provide superimposed illumination of the emitting end 24B by means of the light rays emitted from a plurality of imaginary light-source points $CP_a$, $CP_b$, $CP_c$ and $CP_d$ within the plane including the injection end 24F, thereby providing illumination of highly uniform illuminance.

In the light-source device 11 according to the first embodiment, the explanation has been in terms of a rod integrator 24 having the injection end 24F and the emitting end 24B of rectangular configuration, but it may equally well be of hexagonal, circular or of other configuration, provided that the area to be illuminated and the emitting end 24B are of analogous configuration.

SECOND EMBODIMENT

The following is a description, based on FIG. 1 through FIG. 4, of a projection-type display device 42 according to a second embodiment.

As is shown in FIG. 1, the projection-type display device 42 according to the second embodiment comprises, in addition to the light-source device 11 of the first embodiment, a liquid-crystal panel 61 that functions as a light valve for image formation, and a projection lens 62. In FIG. 1, SC designates a screen on which the picture image is projected.

The liquid-crystal panel 61 comprises an image display area displaying a picture image based on electrical signals from a driver circuit (not shown), in which the optical transparency of the image display area varies in accordance with the density and color of the picture image displayed. The liquid-crystal panel 61 may be driven by either the simple matrix drive method or the active matrix drive method. The material used for the liquid-crystal panel 61 may be twisted nematic (TN) liquid crystal, super-twisted nematic (STN) liquid crystal, polymer dispersed liquid crystal (PDLC) dynamic scattering mode (DSM) liquid crystal or other liquid crystal material. Luminous flux $L_{15}$ that passes through the liquid-crystal panel 61 then becomes light $L_{16}$ that passes through projection lens 62 and is magnified and projected onto the screen SC.

In a case in which the projection lens 62 is non-telecentric, a field lens may be disposed immediately to the rear of the liquid-crystal panel 61 (toward the projection lens 62) or before the liquid-crystal panel 61 (toward the lamp 21) for the purpose of increasing the efficiency with which luminous flux $L_{15}$ is injected into projection lens 62.

It is also possible to use as the light valve a method other than a liquid crystal panel, such as an oil film or other medium that is capable of displaying a picture image electrically.

Figure 4:
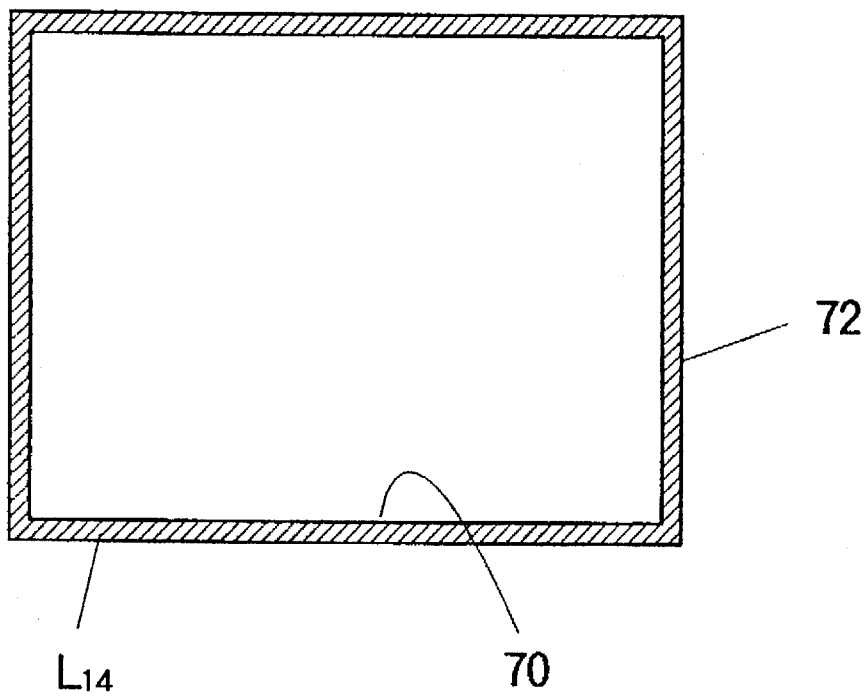
FIG. 4 is an explanatory drawing showing the condition of illumination of the image display area on the liquid crystal panel of the projection-type display device 42 according to the second embodiment.
Figure 29:
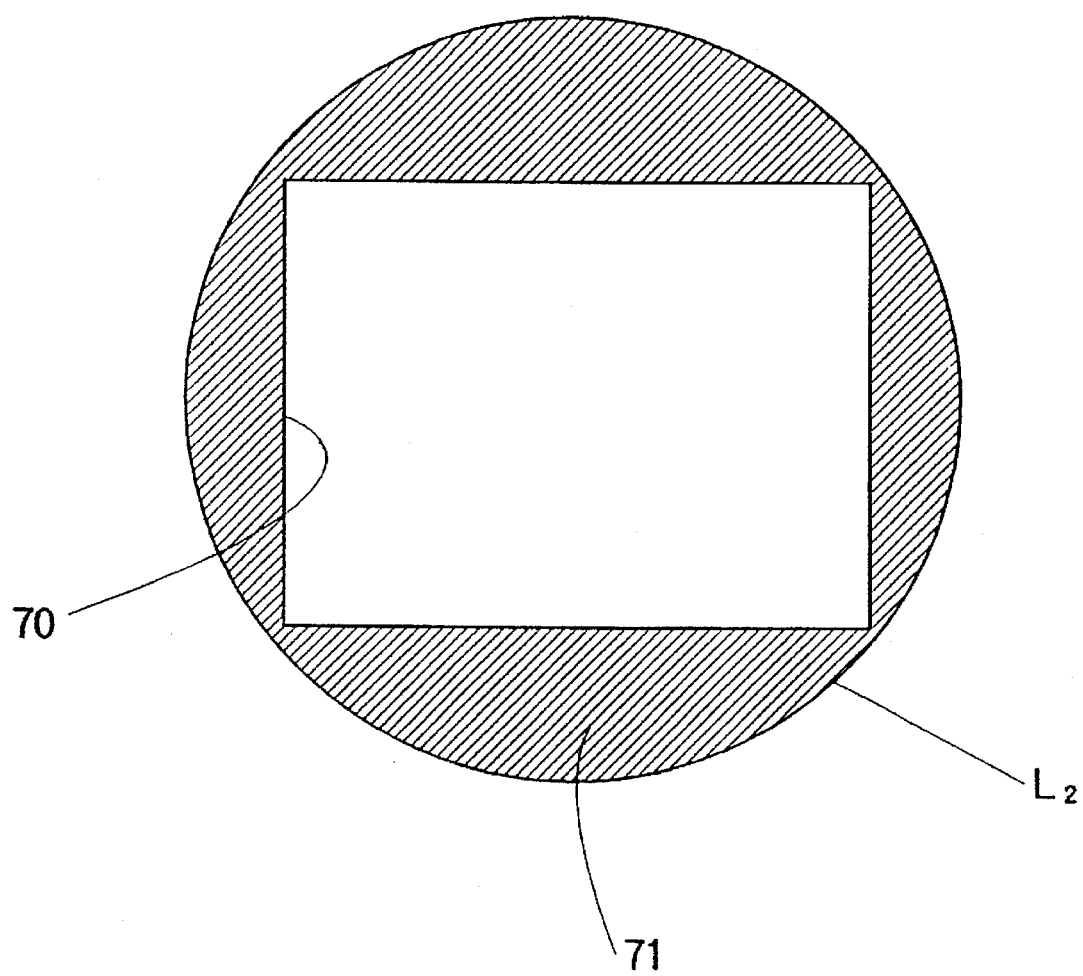
FIG. 29 is an explanatory drawing showing the condition of illumination of the image display area on the liquid crystal panel of projection-type display device according to prior art.

FIG. 4 is an explanatory drawing showing image display area 70 on the liquid crystal panel 61 and the area to be illuminated by luminous flux $L_{14}$. In a projection-type display device according to prior art, projection luminous flux $L_2$ is circular, as shown in FIG. 29, and its diameter was made greater than the diagonal dimension of image display area 70 of the liquid-crystal panel 61, with the result that the luminous flux in the broad area shown by cross-hatching 71 in the drawing made no contribution to projecting the picture image on the screen. However in the projection-type display device 42 of the second embodiment, as shown in FIG. 4, luminous flux $L_{14}$ is a rectangle analogous to the image display area 70 and slightly larger in dimensions, with the result that the luminous flux that makes no contribution to projecting the picture image on screen SC (shown by cross-hatching 72) is extremely small.

As the above description shows, it is possible by means of the projection-type display device 42 of the second embodiment to reduce the loss of luminous flux emitted from the lamp 21, thereby increasing the brightness of the picture image projected on the screen SC. Further the emitting end 24B of the rod integrator 24 is at a highly uniform illuminance, and the image display area 70 of the liquid-crystal panel 61 is uniformly illuminated, thereby reducing nonuniformities In the brightness of the image projected on the screen SC.

Figure 5:
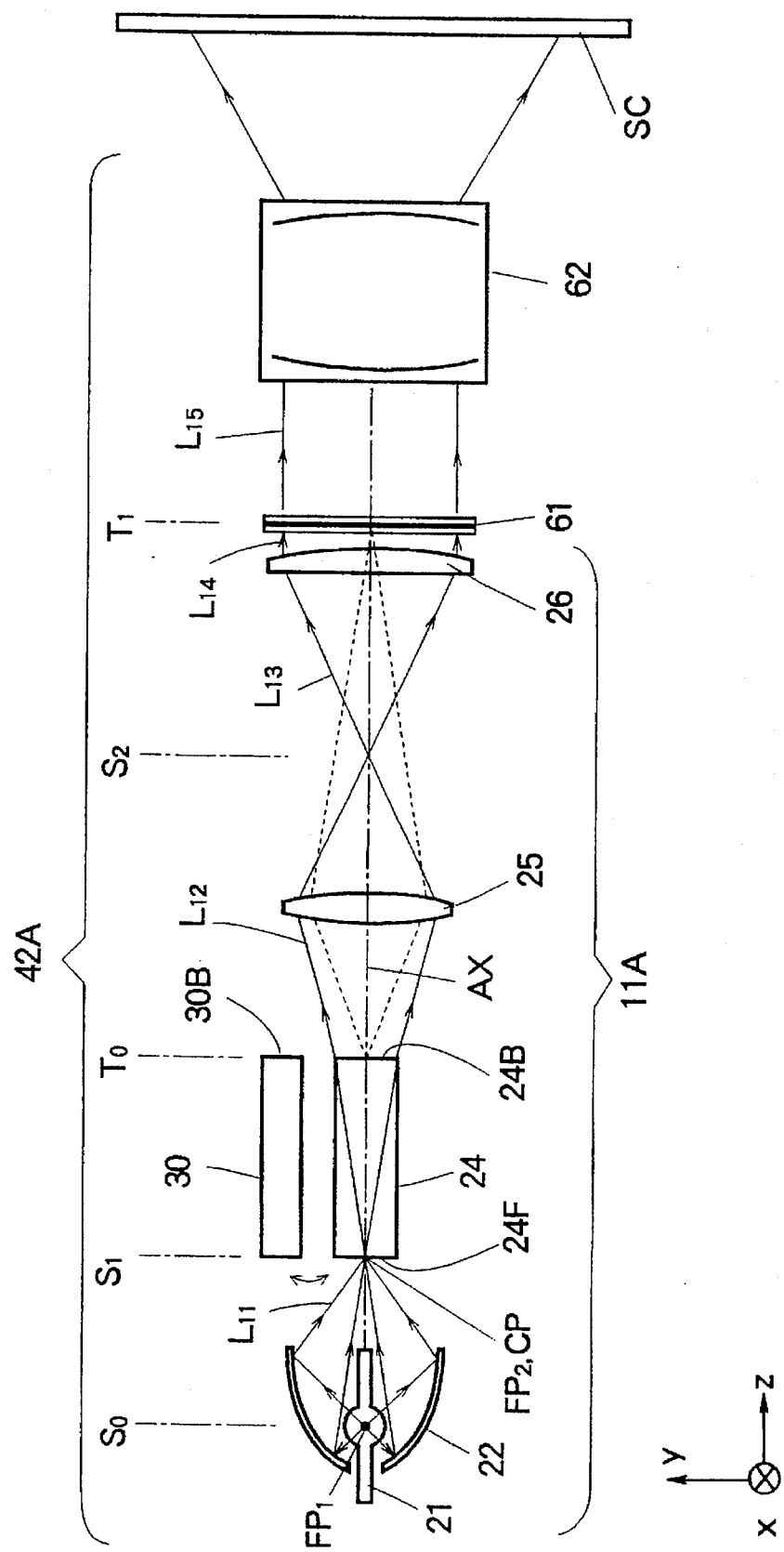
FIG. 5 is a structural drawing showing the general structure of the optical system in a case in which the light-source device according to the first embodiment is provided with a rod integrator switching function.

FIG. 5 is a structural drawing showing the general structure of an example of a variation of the projection-type display device 42 according to the second embodiment. Those structures shown in FIG. 5 that are identical with those in FIG. 1 will be described using the same symbols. The projection-type display device 42A (and the light-source device 11A) in FIG. 5 differs from the device shown in FIG. 1 solely in the respect that it comprises two rod integrators 24 and 30 and that it is provided with a mechanism (not shown) that enables switching between the rod integrators through which the luminous flux from the elliptical mirror 22 passes.

Figure 6A:
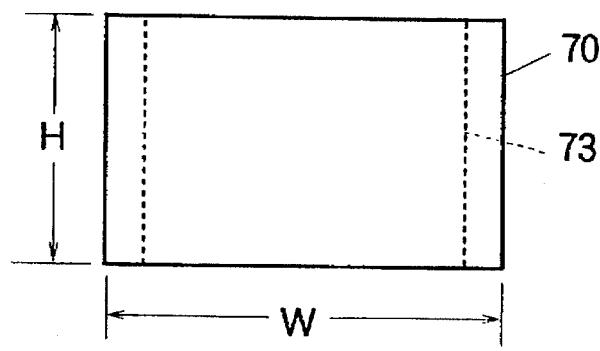
FIGS. 6A, 6B, 6C and 6D are drawings for the purpose of explaining the function of the projection display device in FIG. 5.
Figure 6B:
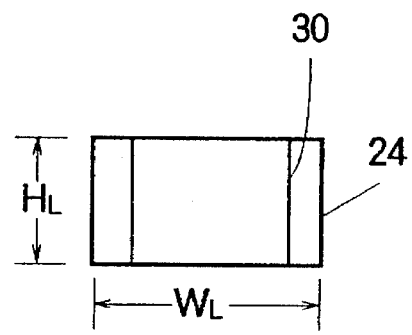

If the rod integrator is switched, so that, in a case in which the aspect ratio (W:H) of image display area 70 of the liquid-crystal panel 61 is 16:9, as shown in FIG. 6A, the rod integrator 24 having an aspect ratio ($W_L:H_L$) of 16:9, shown in FIG. 6B, is used, and when a picture image 73 having an aspect ratio of 4:3, as shown by the broken lines in FIG. 6A, is to be displayed on an image display area 70 having an aspect ratio of 16:9, the rod integrator 30 having an aspect ratio ($W_L:H_L$) of 4:3 shown in FIG. 6B is used, it is possible to reduce the waste of illuminating luminous flux and increase the brightness of the projected image.

Figure 6C:
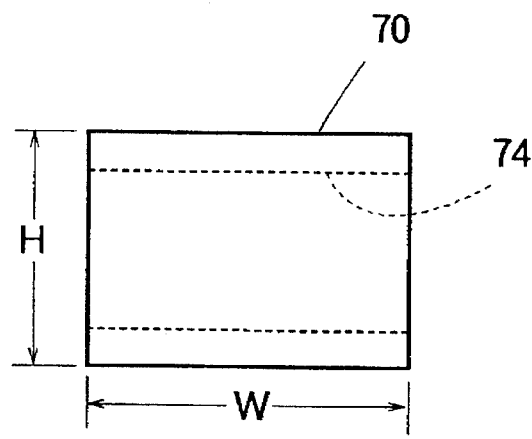
Figure 6D:
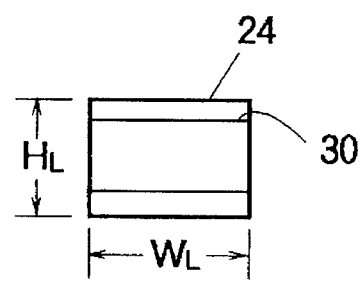

Similarly, if the rod integrator is switched, so that, in a case in which the aspect ratio (W:H) of the image display area 70 of the liquid-crystal panel. 61 is 4:3, as shown in FIG. 6C, the rod integrator 24 having an aspect ratio ($W_L:H_L$) of 4:3, shown in FIG. 6D, is used, and when a picture image 74 having an aspect ratio of 16:9, as shown by the broken lines in FIG. 6C, is to be displayed on an image display area 70 having an aspect ratio of 4:3, the rod integrator 30 having an aspect ratio ($W_L:H_L$) of 16:9 shown in FIG. 6D is used, it is possible to reducing the waste of luminous flux and increase the brightness of the projected image.

THIRD EMBODIMENT

Figure 7:
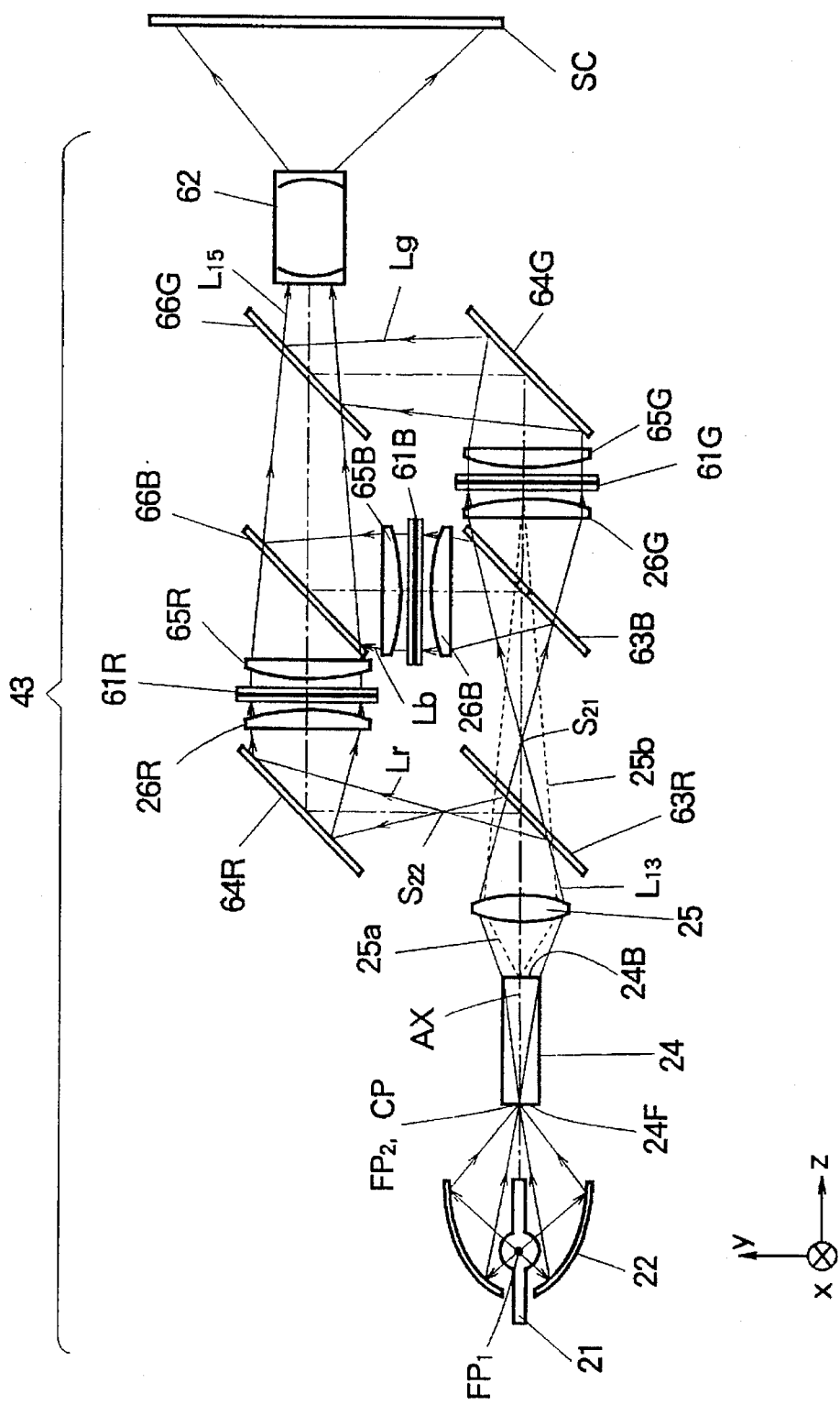
FIG. 7 is a structural drawing showing the general structure of the optical system of a projection-type display device 43 according to a third embodiment.

Following is a description, based on FIG. 7, of a projection-type display device 43 according to a third embodiment.

FIG. 7 is a structural drawing showing the general structure of the optical system of the projection-type display device 43 capable of displaying a color picture image, according to the third embodiment.

As is shown in the drawing, the projection-type display device 43 of the third embodiment has the light-source device 11 structurally the same as that of the first embodiment. The light-source device 11 comprises a lamp 21, an elliptical mirror 22, a rod integrator 24 and a relay lens 25. The projection-type display device 43 further comprises first field lenses 26R, 26B and 26G.

The projection-type display device 43 further comprises a dichroic mirror 63R for color separation that reflects only red light $L_r$ and transmits other color components, a dichroic mirror 63B for color separation that reflects only blue light $L_b$ and transmits other color components, and light-reflecting mirrors 64R and 64G. Further, the projection-type display device 43 comprises a dichroic mirror 66B for color synthesis that reflects only blue light $L_b$ and transmits other color components, a dichroic mirror for color synthesis 66G that reflects only green light $L_g$ and transmits other color components, liquid crystal panels 61R, 61G, and 61B, second field lenses 65R, 65G and 65B and projector lens 62.

The relay lens 25 is so disposed as to form the image on the emitting end 24B of the rod integrator 24 onto the liquid-crystal panels 61R, 61G and 61B. The conjugate relationship between the emitting end 24B and the liquid-crystal panel 61G for green light $L_g$ at this time is shown by broken lines 2a and 25b in FIG. 7. Since the optical distance from the relay lens 25 to the liquid-crystal panel 61R for red light $L_r$, and the optical distance from the relay lens 25 to the liquid-crystal panel 61B for blue light $L_b$, are identical to the optical distance from relay lens 25 to liquid-crystal panel 616 for green light $L_g$, the conjugate image of the emitting end 24B is also formed on the image display areas of the liquid-crystal panels 61R and 61B, and the image display areas of the liquid-crystal panels 61R, 61B and 61G are illuminated by a luminous flux of a cross-sectional configuration that is analogous to the image display area and the same or slightly larger in size.

Since the first field lenses 26R, 26B and 26G, which are disposed near the front side of the liquid-crystal panels 61R, 61G and 61B, are so set that their front-side focal points coincide, in the case of the field lens 26R, with the position of secondary light-source image $S_{22}$, and in the case of the field lenses 26G and 26B, with the position of secondary light-source image $S_{21}$, the luminous fluxes $L_r$, $L_g$ and $L_b$ impinging on the liquid-crystal panels 61R, 61G and 61B are rendered parallel.

In the projection-type display device 43, red component $L_r$ of luminous flux $L_{13}$, which was emitted from the lamp 21 and passed through the rod integrator 24 and the relay lens 25, is reflected by the dichroic mirror 63R, its direction is changed by the mirror 64R, and it passes through the liquid-crystal panel 61R and the field lens 65R and through the dichroic; mirrors 66B and 66G, and impinges on the projection lens 62. The blue light component $L_b$ passes through the dichroic mirror 63R, is reflected by the dichroic mirror 63B, passes through the liquid-crystal panel 61B and the field lens 65B, is reflected by the dichroic mirror 66B, passes through the dichroic mirror 66G and impinges on the projection lens 62. The green light component $L_g$ passes through the dichroic mirrors 63R and 63B and through the liquid-crystal panel 61G and the field lens 65G, its direction is changed by the mirror 64G, and it is reflected by the dichroic mirror 66G and impinges on the projection lens 62. Synthesized luminous flux $L_{15}$ is then magnified and projected as projected light onto the screen SC.

As has been described above, in the projection-type display device 43 of the third embodiment, the image display areas of the liquid-crystal panels 61R, 61G and 61B, as is shown in FIG. 4, are of analogous configuration and are illuminated with a luminous flux of a cross-sectional configuration that is analogous to the image display area 70 and slightly larger in size, so that loss of illuminating light can be reduced and the brightness of the image projected on the screen SC raised. Further, by means of the projection-type display device 43, the degree of uniformity of illuminance of the emitting end 24B of the rod integrator 24 is high, and the image display areas of the liquid-crystal panels 61R, 61G and 61B are uniformly illuminated, so that nonuniformity in the image projected on the screen SC can be reduced.

FOURTH EMBODIMENT

Figure 8:
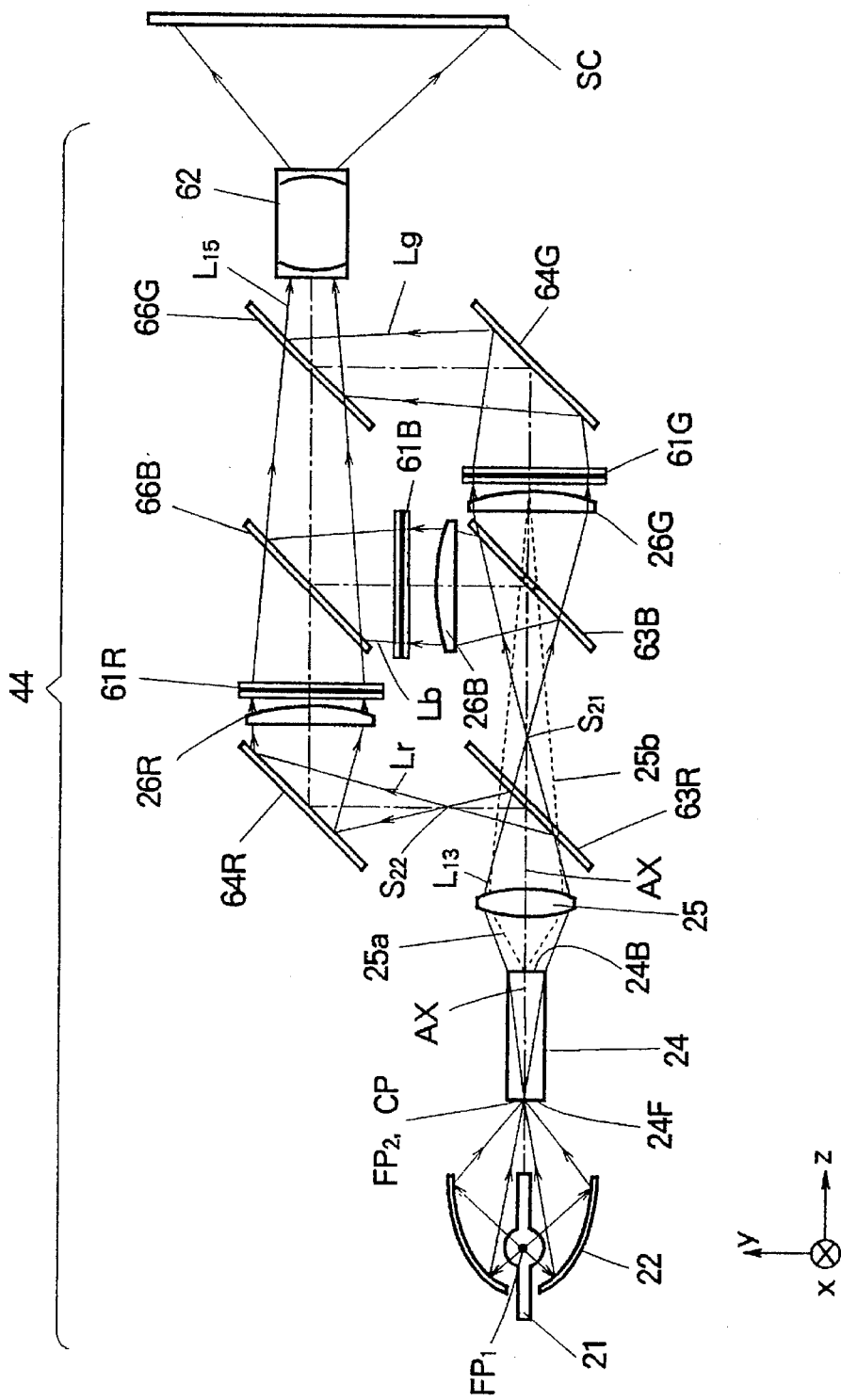
FIG. 8 is a structural drawing showing the general structure of the optical system of a projection-type display device 44 according to a fourth embodiment.

Following is a description, based on FIG. 8, of a projection-type display device 44 according to a fourth embodiment.

The projection-type display device 44 according to the fourth embodiment differs from the projection-type display device 43 of the third embodiment (FIG. 7) solely in the respect that it is not provided with second field lenses 65R, 65G and 65B, and conjugate images of secondary light-source images $S_{22}$ and $S_{21}$ are formed on the entrance pupil of the projection lens 62 by means of the first field lenses 26R, 26G and 26B. With the exception of this point, the projection-type display device 44 of the fourth embodiment is identical with the device of the third embodiment.

FIG. 8 shows a case in which the projection lens 62 is a non-telecentric system in which the entrance pupil is located at a point with a finite distance from the projection lens 62, but in eases in which the projection lens 62 is a telecentric system, the entrance pupil is located in a point with an infinite distance from the projection lens 62 and the light-source images due to the field lenses 26R, 26G and 26B are also formed at a point with an infinite distance from the projection lens 62, so that it is desirable that the illuminating light that passes through the field lenses 26R, 26G and 26B to illuminate the liquid-crystal panels 61R, 61G and 61B, respectively, be parallel luminous fluxes.

Although in the fourth embodiment above described, the description relates to a case in which conjugate images of secondary light-source images $S_{22}$ and $S_{21}$ are formed on the entrance pupil of the projection lens 62 by means of the first field lenses 26R, 26G and 26B, it is also possible for conjugate images of secondary light-source images $S_{22}$ and $S_{21}$ to be formed on the entrance pupil of the projection lens 62 without first field lenses 26R, 26G and 26B, but by means of the second field lenses 65R, 65G and 65B (shown in FIG. 7).

FIFTH EMBODIMENT

Following is a description, based on FIG. 9 through FIG. 16, of a light-source device 12 according to a fifth embodiment.

Figure 9:
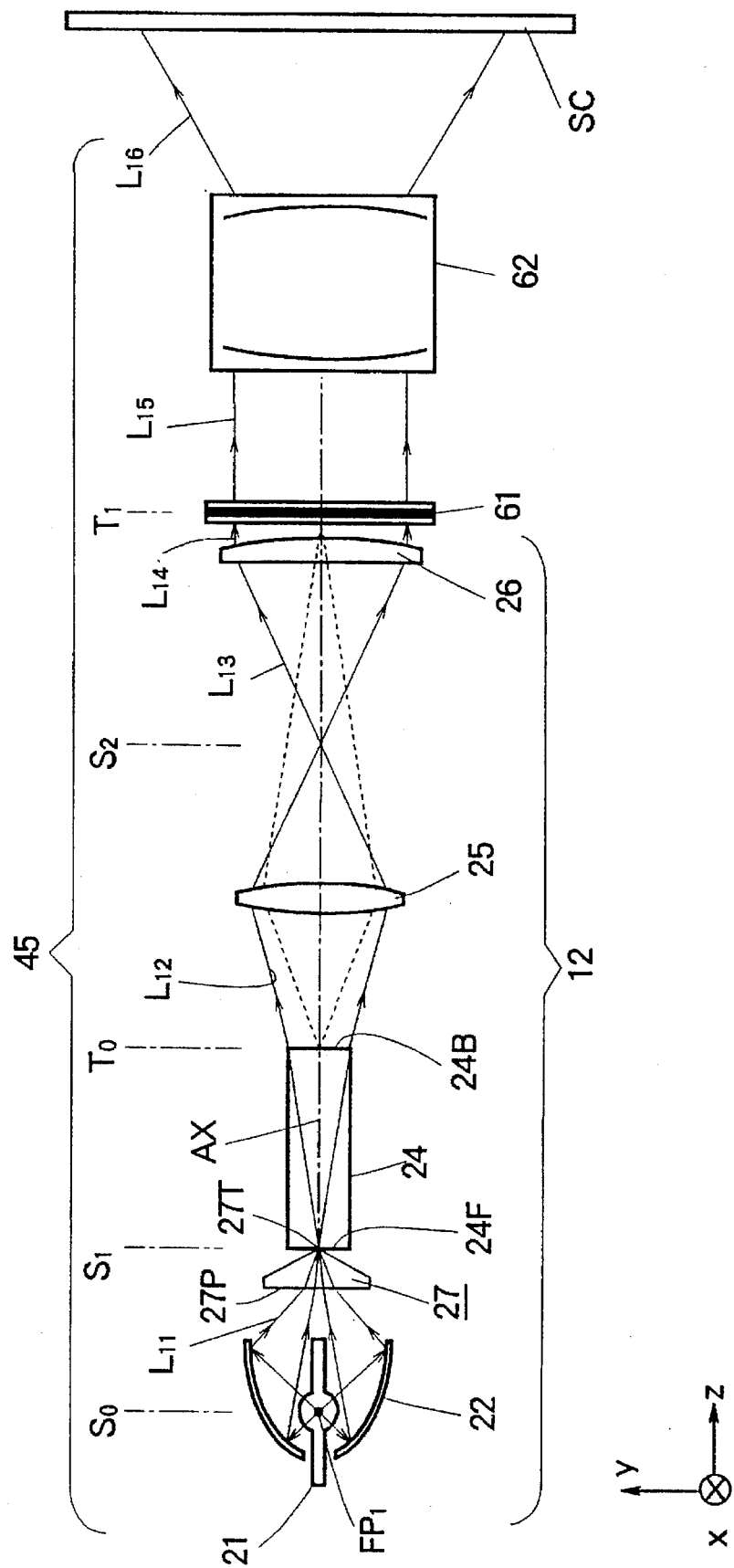
FIG. 9 is a structural drawing showing the general structure of a light-source device 12 according to a fifth embodiment and a projection-type display device 4S according to a sixth embodiment.

FIG. 9 is a structural drawing showing the general structure of the optical system of the light-source device 12 according to the fifth embodiment and of a projection-type display device 45 containing the light-source device 12.

In the light-source device 12 of the fifth embodiment those structures that are identical with those of the light-source device 11 of the first embodiment will be described using the same symbols. The light-source device 12 according to the fifth embodiment differs from the light-source device 11 of the first embodiment solely in the respect that the cone-shaped lens 27 is provided in the vicinity of the second focal point of the elliptical mirror 22, on the front side (lamp 21 side) of the rod integrator 24. The cone-shaped lens 27 has a planar face 27P that may be circular, elliptical or rectangular, and is so disposed that planar face 27P faces toward the lamp 21 and its apex 27T faces toward the injection end 24F of the rod integrator 24.

Figure 10:
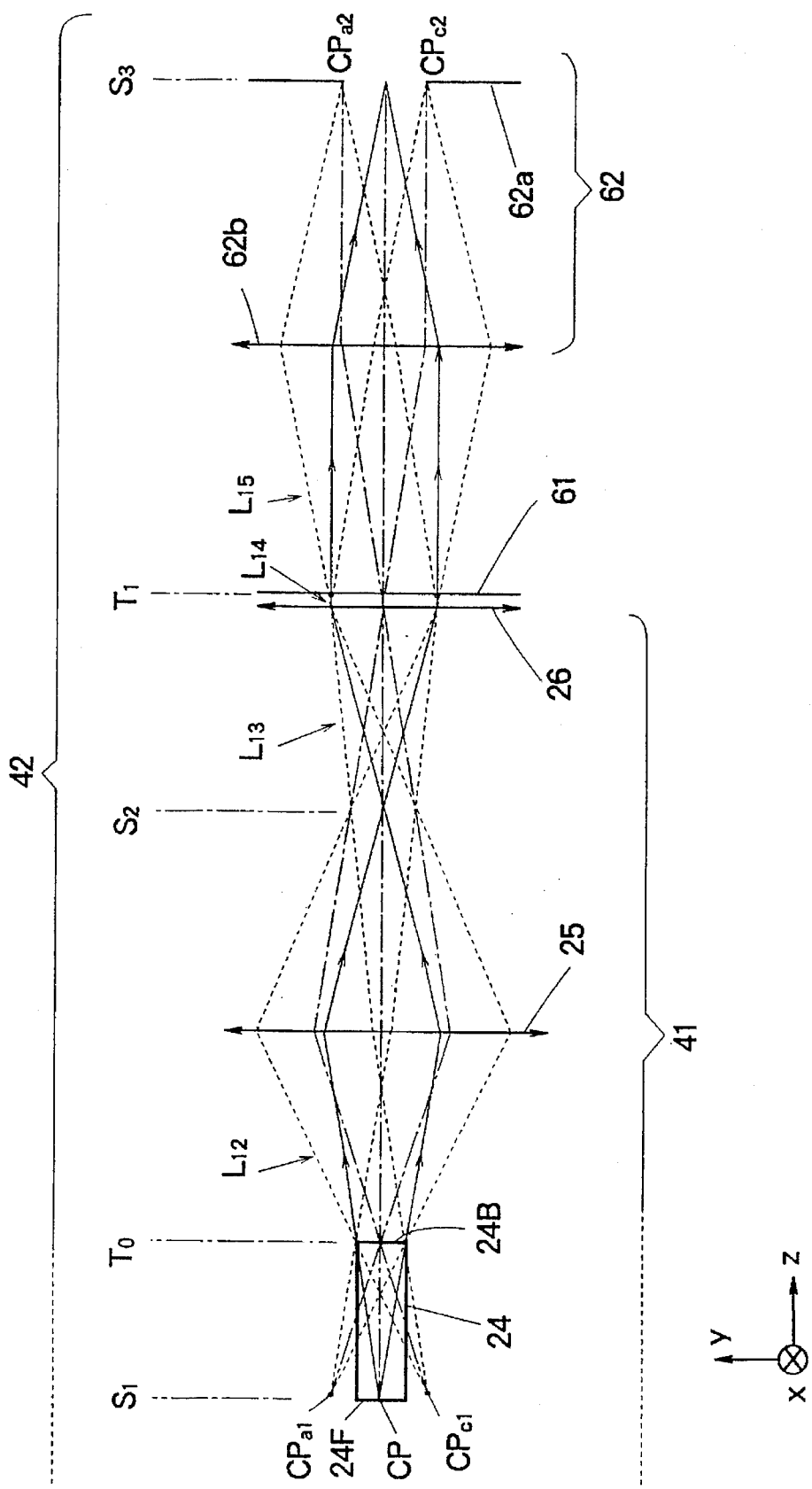
FIG. 10 is an explanatory drawing for the purpose of explaining reason for providing the light-source device 12 of the fifth embodiment with a cone-shaped lens.

FIG. 10 is an explanatory drawing for the purpose of explaining the reason for providing the light-source device 12 of the fifth embodiment with the cone-shaped lens 27, and is a light ray diagram showing an example of illuminating light in the light-source device 11 and the projection-type display device 42 of the first embodiment.

As noted above in the description of the first embodiment (FIG. 1 through FIG. 3), it is desirable, in order to increase the uniformity of illuminance of the emitting end 24B of the rod integrator 24 and thereby reduce nonuniformity in the brightness of the projected image, that the number of imaginary light-source images $CP_{a1}$, $CP_{c1}$ and the like on plane $S_1$ be increased. In this case the light-source image on plane $S_2$ becomes larger and the degree of parallelism of light ray $L_{14}$ impinging on surface to be illuminated $T_1$ decreases, with the result that when the liquid-crystal panel 61 is composed of polymer dispersed, dynamic scattering mode, or other scatter type liquid crystals, contrast is diminished.

Further, when imaginary light-source images $CP_{a1}$ and $CP_{c1}$ become larger the light-source images formed on planes $S_2$ and $S_3$ become larger, requiring that the aperture of the projection lens 62 be opened (that is to say that the F number of the projection lens 62 must be reduced), running counter to requirements relating to the performance and cost of the projection-type display device (namely that the F number be increased).

The cone-shaped lens 27 is provided because it both satisfies the requirement for an increase in the uniformity of illuminance of the emitting end 24B and at the same time increases the degree of parallelism of light ray $L_{14}$ thereby satisfying the requirement for an increase in the F number of projection lens 62.

Figure 11:
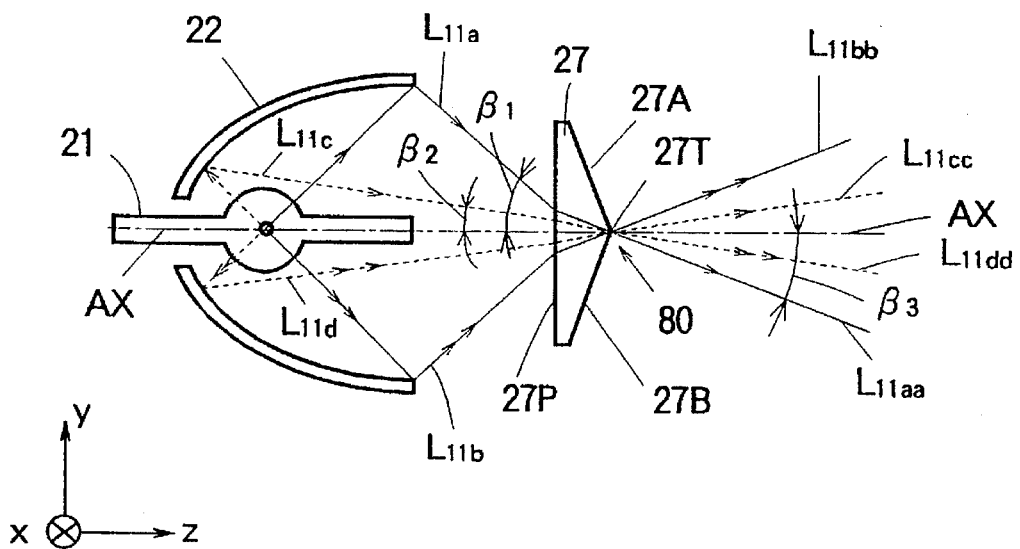
FIG. 11 is an explanatory drawing for the purpose of explaining the function of the cone-shaped lens in the light-source device 12 of the fifth embodiment.
Figure 12:
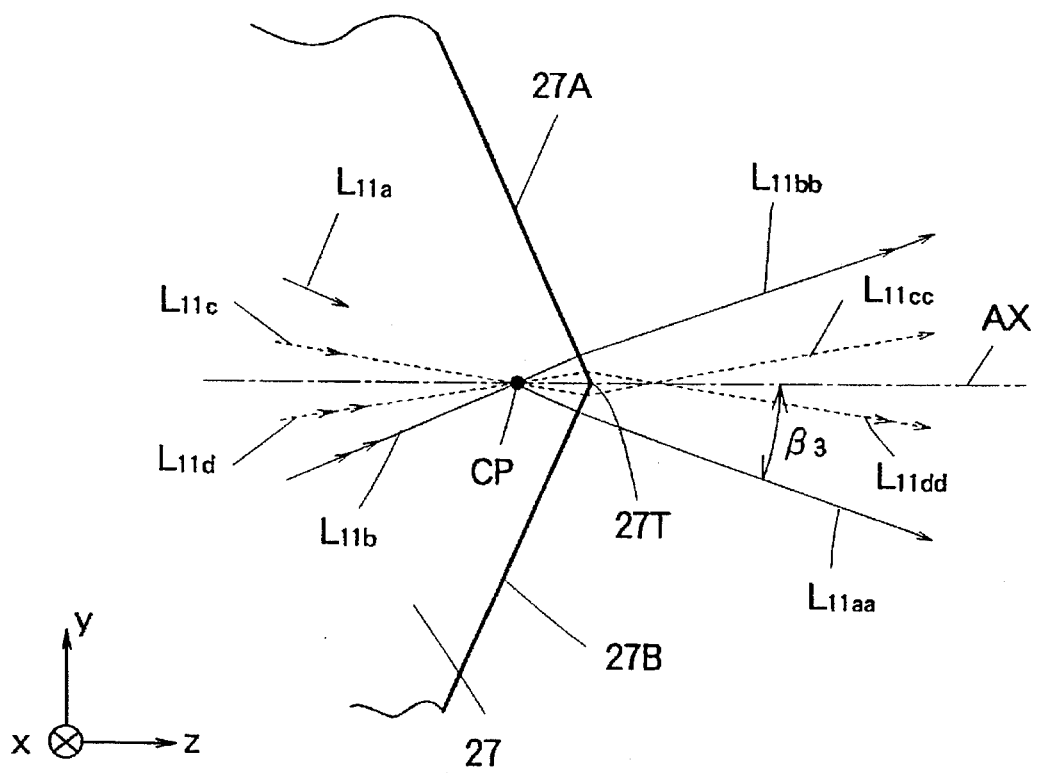
FIG. 12 is an explanatory drawing showing an enlargement of the area around the apex of the cone-shaped lens in FIG. 11.
Figure 13:
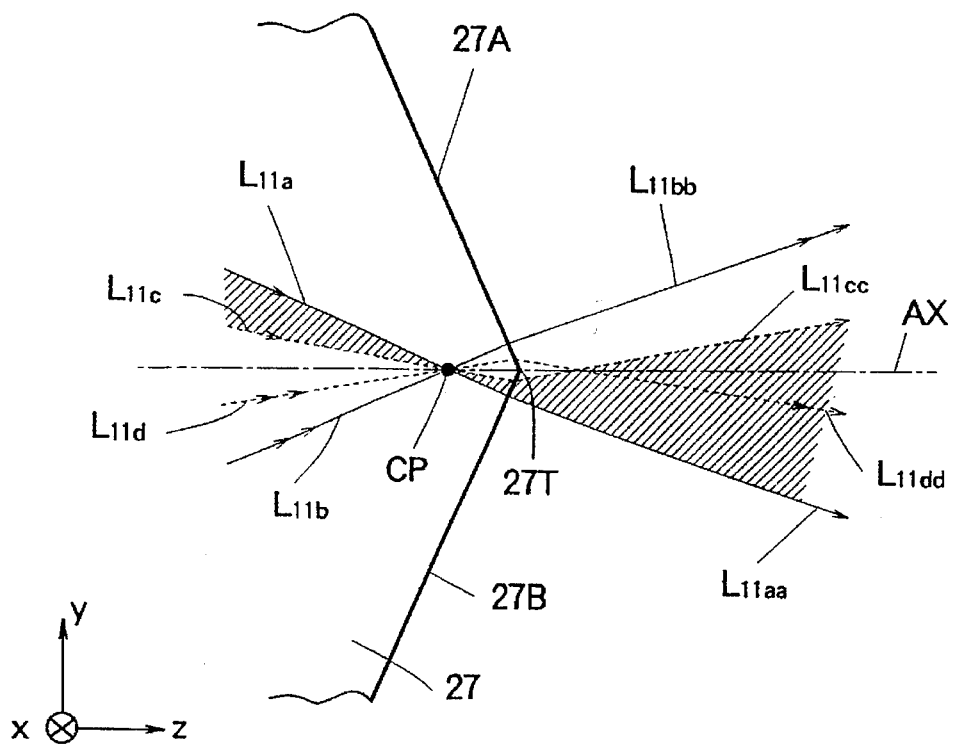
FIG. 13 is an explanatory drawing for the purpose of explaining the reason that time uniformity of illumination is increased by means of the cone-shaped lens in FIG. 11.
Figure 14:
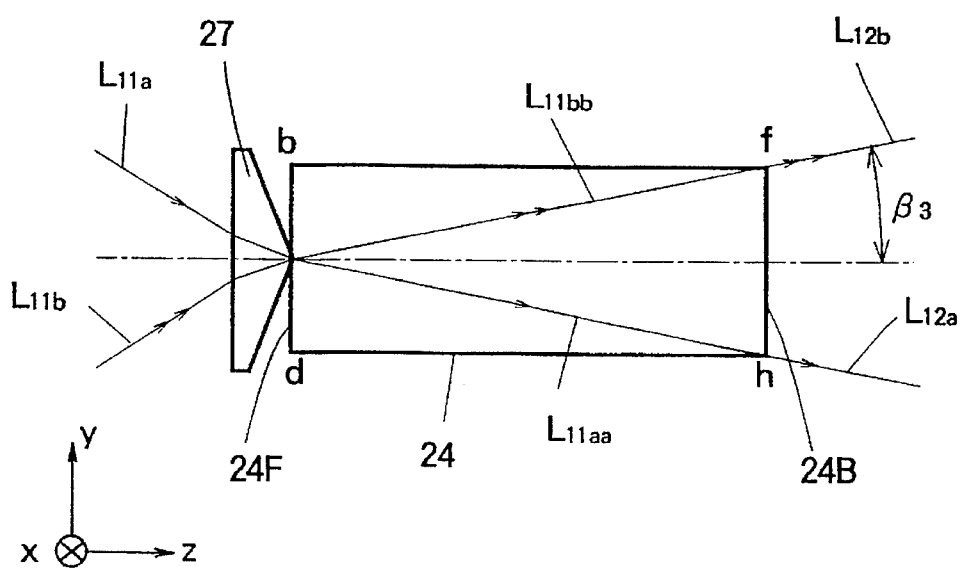
FIG. 14 is an explanatory drawing for the purpose of explaining the method of optimizing the configuration of the cone-shaped lens and rod integrator in the light-source device 12 of the fifth embodiment.

FIG. 11 is an explanatory drawing for the purpose of explaining the function of the cone-shaped lens 27 in the light-source device 12 of the fifth embodiment, and FIG. 12 and FIG. 13 are explanatory drawings showing an enlargement of the area around the apex 27T of the cone-shaped lens 27 (the area designated by reference numeral 80 in FIG. 11). In FIG. 11, convergence point CP is shown as coinciding with the apex 27T of cone-shaped lens 27, but in actuality, convergence point CP is located, as is shown in FIG. 12, slightly toward the lamp 21 (within the cone-shaped lens 27) from the apex 27T.

As is shown in FIG. 11 through FIG. 13, light ray $L_{11a}$, which impinges on planar face 27P of the cone-shaped lens 27 at an entrance angle $\beta_1$ (from optical axis AX), first passes through convergence point CP within the cone-shaped lens 27, is refracted by a sloping surface 27B of the cone-shaped lens 27, and is emitted as light ray $L_{11aa}$ at an emission angle $\beta_3$ (from optical axis AX) that is smaller than entrance angle $\beta_1$. Light ray $L_{11b}$, which impinges on the planar face 27P of the cone-shaped lens 27 at an entrance angle of $\beta_1$ first passes through convergence point CP within the cone-shaped lens 27, is refracted by a sloping surface 27A of the cone-shaped lens 27, and is emitted as light ray $L_{11bb}$ at an emission angle $\beta_3$ that is smaller than entrance angle $\beta_1$.

Light ray $L_{11c}$ (in the optical axis AX direction from the lamp 21 there is a dark area where little luminous flux is emitted anti light ray $L_{11c}$ is the dark area boundary light ray from the boundary of the dark area), which impinges on the planar face 27P of the cone-shaped lens 27 at an entrance angle of $\beta_2$ first passes through convergence point CP of cone-shaped lens 27, is refracted by the sloping surface 27B of the cone-shaped lens 27, and is emitted as light ray $L_{11cc}$ in a direction that intersects optical axis AX (upward in the drawing). The light ray $L_{11d}$ (the dark area boundary light ray), which impinges on the planar face 27P of the cone-shaped lens 27 at an entrance angle of $\beta_2$, first passes through convergence point CP of the cone-shaped lens 27, is refracted by sloping surface 27A of the cone-shaped lens 27, and is emitted as light ray $L_{11dd}$ in a direction that intersects optical axis AX (downward in the drawing).

As shown by the cross-hatching in FIG. 13, the luminous flux between incident light rays $L_{11a}$ and $L_{11c}$ is emitted from cone-shaped lens 27 and becomes the luminous flux between emitted light rays $L_{11aa}$ and $L_{11cc}$. Similarly, the luminous flux between incident light rays $L_{11b}$ and $L_{11d}$ is emitted from cone-shaped lens 27 and becomes the luminous flux between emitted light rays $L_{11bb}$ and $L_{11dd}$.

Since, as can be seen, the luminous flux emitted from cone-shaped lens 27 overlaps in the vicinity of optical axis AX, it is possible to increase the illuminance In the direction of optical axis AX, even when lamp 21 is a discharge lamp the discharge electrode of which is disposed in parallel with optical axis AX. Thus it is possible to reduce nonuniformity in illuminance even without increasing the number of imaginary light-source images, as was the case in the first embodiment.

Further, since providing the cone-shaped lens 27 reduces emission angle $B_3$ of the emitted luminous flux, the combination of the cone-shaped lens 27 and rod integrator 24 makes it possible to reduce the number of imaginary light-source images caused by total reflection at the side surfaces of rod integrator 24 and decrease the size of secondary light-source images. For example in FIG. 14, which shows one example of preferred design conditions for the cone-shaped lens 27 and the rod integrator 24, if the design is such that, after passing through the cone-shaped lens 27, outer-most light ray $L_{11aa}$ coincides with a corner h of the emitting end 24B of the rod integrator 24 and outermost light ray $L_{11bb}$ coincides with a corner f of the emitting end 24B of the rod integrator 24, the size of the secondary light-source images can be reduced. In this case the degree of parallelism of the luminous flux impinging on the liquid-crystal panel 61 can be improved, and at the same time the F number of the projection lens 62 can be increased.

In FIG. 11, in order to reduce to the minimum emission angle $\beta_3$ of outermost light ray $L_{11aa}$ (or $L_{11bb}$) emitted from the cone-shaped lens 27, it is desirable that the design be such that the relationship between the emission angle $\beta_3$ and the angle of convergence $(\beta_1-\beta_2)$ formed between dark boundary light ray $L_{11c}$ and outermost light ray $L_{11a}$ (or between dark boundary light ray $L_{11d}$ and outermost light ray $L_{11b}$ incident to cone-shaped liens 27 be expressed by $$\beta_3 \div (\beta_1-\beta_2)/2 \qquad (1)$$

When the emission angle $\beta_3$ is to be decreased, it is desirable that, considering the fact that the intensity of light ray $L_{11a}$ is greater than the intensity of light ray $L_{11c}$, which has passed through the cone-shaped lens 27, the design be such that the angle formed between light ray $L_{11cc}$ and optical axis AX be larger than the angle formed between light ray $L_{11aa}$, which has passed through the cone-shaped lens 27, and the optical axis.

In a case in which the cone-shaped lens 27 is a circular cone, emission angle $\beta_3$ of the cone-shaped lens 27 form an identical angle in any of the cross-sections including optical axis AX, so that if, within the diagonal cross-sections of the rod integrator 24 (the cross-sections "adhe" or "bcgf" in FIG. 2), the corner of the emitting end 24B (angles e, f, g and h in FIG. 2) is arranged so as to be cut by outermost light rays $L_{11bb}$ or $L_{11aa}$, the emitting end 24B will become a light-source surface of high luminous intensity. In this way it is possible to reduce the total reflection due to the side surfaces of the rod integrator 24 to a minimum and to increase the degree of parallelism of the illuminating luminous flux impinging on the liquid-crystal panel 61.

Figure 15A:
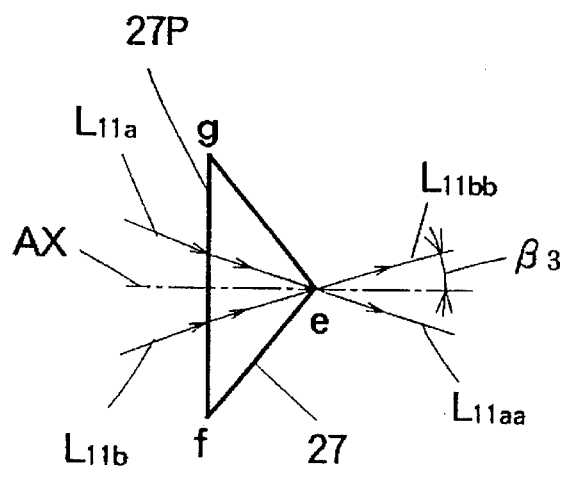
FIGS. 15A and 15B are explanatory drawings showing another example of a cone-shaped lens in the light-source device 12 of the fifth embodiment.
Figure 15B:
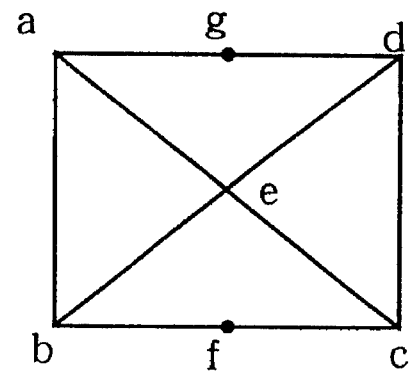
Figure 16A:
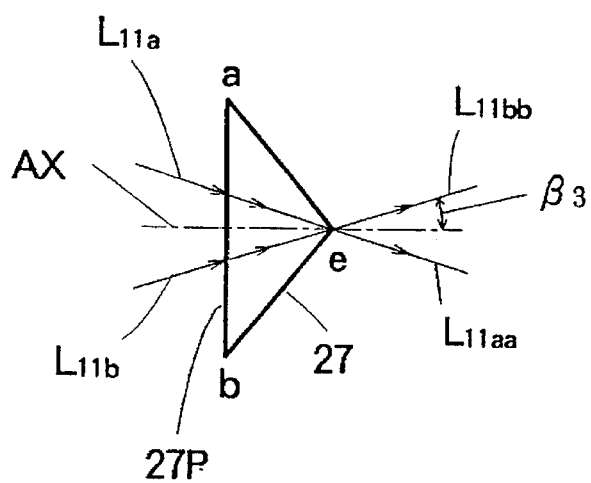
FIGS. 16A and 16B are explanatory drawings showing yet another example of a cone-shaped lens in the light-source device 12 of the fifth embodiment.
Figure 16B:
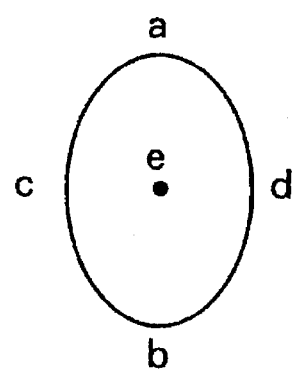

In a case in which the cone-shaped lens 27 is an elliptical cone, pyramid or the like, anisotropy occurs in emission angle $\beta_3$ of the cone-shaped lens 27, depending on the direction of the cross-section including optical axis AX. FIG. 15A and FIG. 15B respectively show a side view and a front view of a case in which the cone-shaped lens 27 is a pyramid. In this case the apex angle is smallest at cross-section "gef" and largest at cross-section "bed" (or "aec"). FIG. 16A and 16B respectively show a side view and a front view of a case in which the cone-shaped lens 27 is an elliptical cone. In this case emission angle $\beta_3$ is largest at cross-section "aeb", which includes the major axis of the ellipse, and emission angle $\beta_3$ is smallest at cross-section "ced", which includes the minor axis of the ellipse. Thus it is possible to select that cone-shaped lens 27 by which the anisotropy of emission angle $\beta_3$ is optimized, in accordance with the cross-sectional configuration of the rod integrator 24.

For example, in a case in which the rod integrator 24 is a rectangular pillar, a cone-shaped lens 27 may be used that emits a luminous flux such that the conditions under which there is reflection at the side surfaces of the rod integrator 24 are realized, and that emission angle $\beta_3$ is largest with respect to cross-section "adhe" (or "cbfg") in FIG. 2 and smallest with respect to cross-section y–z. In this way the total reflection at the side surfaces of the rod integrator 24 is less than when a circular-cone lens is used, and it is possible to reduce the number of secondary light-source images on plane $S_2$ and effect significant improvement in the degree of parallelism of the illuminating light impinging on the liquid-crystal panel 61.

SIXTH EMBODIMENT

Following is a description, based on FIG. 9 and FIG. 4, of a projection-type display device 45 according to a sixth embodiment.

As is shown in FIG. 9, the projection-type display device 45 according to the sixth embodiment comprises, in addition to light-source device 12 of the fifth embodiment, a liquid-crystal panel 61 that functions as a light valve for image formation, and a projection lens 62. Here the liquid-crystal panel 61 and the projection lens 62 are identical to those of the second embodiment.

In the projection-type display device 45 according to the sixth embodiment, as is shown in FIG. 4, image display area 70 of the liquid-crystal panel 61 is illuminated by a luminous flux of a cross-sectional configuration that is analogous to the image display area 70 or slightly larger in size, so that the amount of luminous flux that makes no contribution to projecting the image on the screen SC (the flux shown as hatched area) can be almost entirely eliminated. It is therefore possible, by means of the projection-type display device 45 of the sixth embodiment, to reduce the loss of luminous flux emitted from the lamp 21, thereby increasing the brightness of the projected image.

Further, through the provision of the cone-shaped lens 27, the emitting end 24B of the rod integrator 24 is at a highly uniform illuminance and the image display area of the liquid-crystal panel 61 is also uniformly illuminated, so that it is possible to reduce nonuniformities in the brightness of the image projected on the screen SC.

SEVENTH EMBODIMENT

Figure 17:
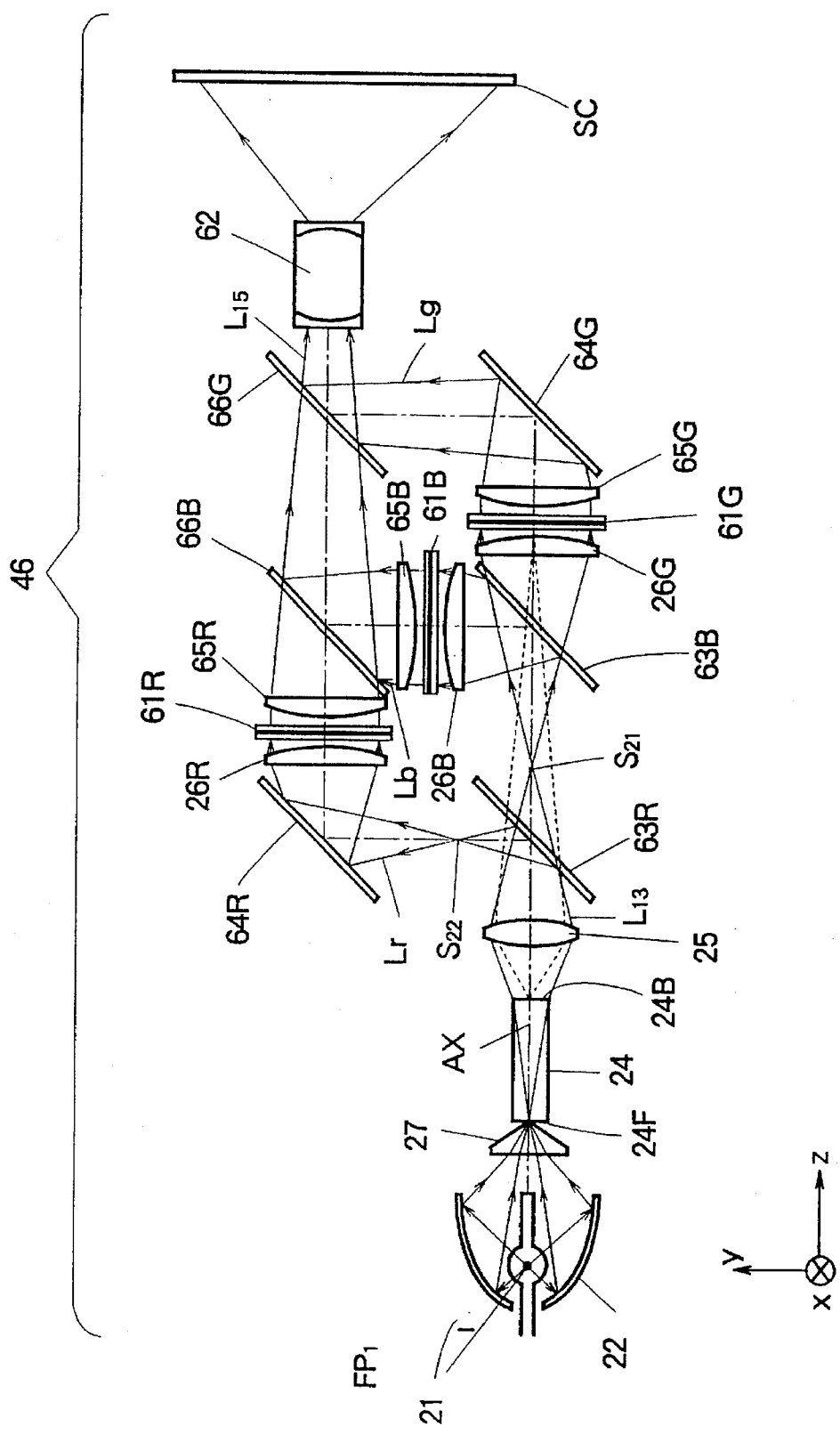
FIG. 17 is a structural drawing showing the general structure of the optical system of a projection-type display device 46 according to a seventh embodiment.

Following is a description, based on FIG. 17, of a projection-type display device 46 according to a seventh embodiment.

FIG. 17 is a structural drawing showing the general structure of the optical system of projection-type display device 46 capable of displaying a color Image according to this seventh embodiment.

In the projection-type display device 46 of the seventh embodiment, those structures that are identical with those of the projection-type display device 43 of the third embodiment (FIG. 7) will be described using the same symbols. The projection-type display device 46 according to the seventh embodiment differs from the projection-type display device 43 of the third embodiment solely in the respect that the cone-shaped lens 27 is provided in the vicinity of the second focal point of the elliptical mirror 22, on the front side (lamp 21 side) of the rod integrator 24. The cone-shaped lens 27 is identical to that of the fifth embodiment.

It is therefore possible, by means of the projection-type display device 46 of the seventh embodiment, to increase the brightness of the projected image in the same way as in the fifth embodiment, and, by providing the cone-shaped lens 27, to reduce the nonuniformity in the brightness of the image projected on screen SC.

EIGHTH EMBODIMENT

Figure 18:
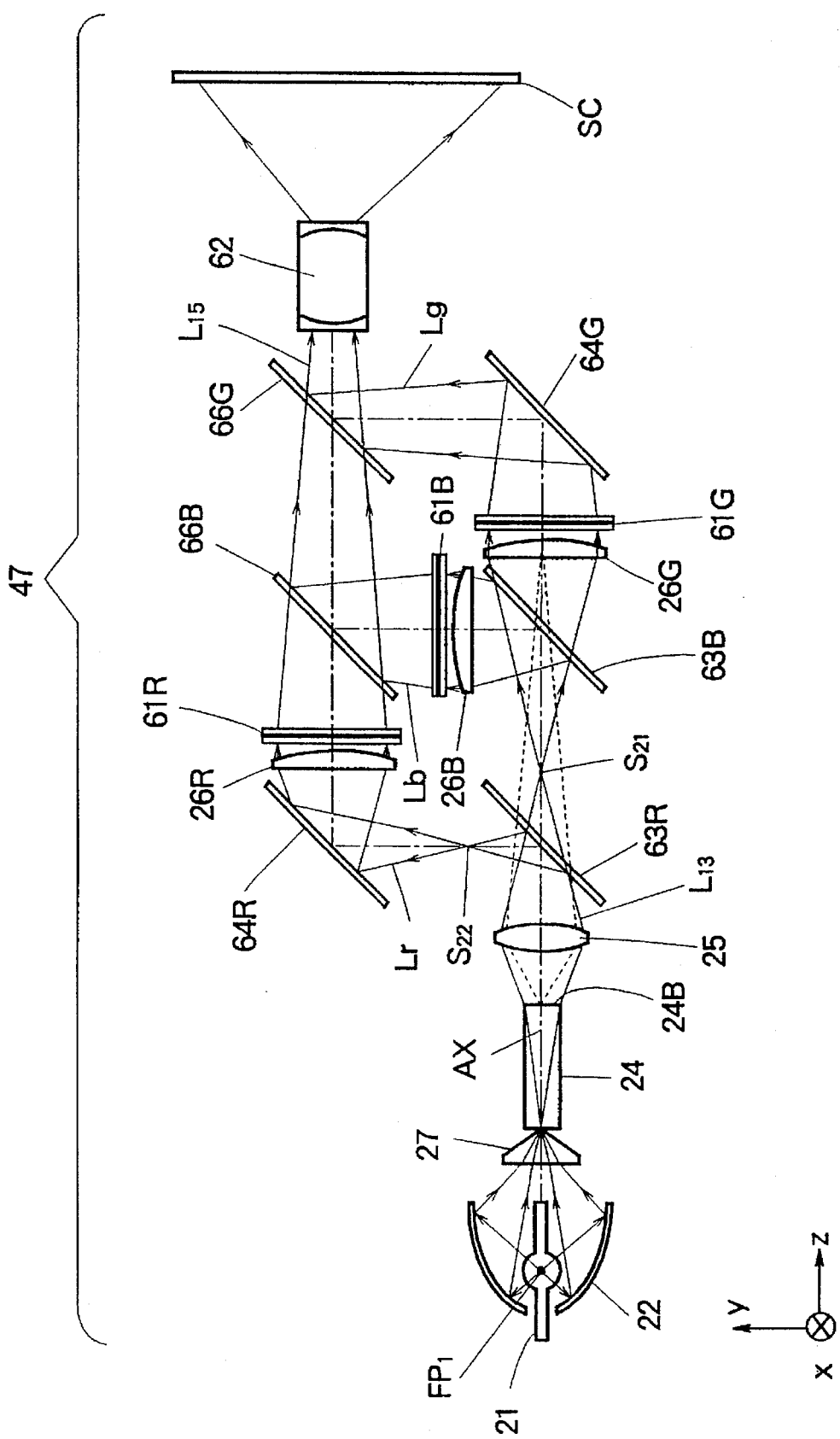
FIG. 18 is a structural drawing showing the general structure of the optical system of a projection-type display device 47 according to an eighth embodiment.

Following is a description, based on FIG. 18 of a projection-type display device 47 according to an eighth embodiment.

FIG. 18 is a structural drawing showing the general structure of the optical system of a projection-type display device 47 capable of displaying a color image, according to the eighth embodiment.

In the projection-type display device 47 of the eighth embodiment, those structures that are identical with those of projection-type display device 44 of the fourth embodiment (FIG. 8) will be described using the same symbols. The projection-type display device 47 according to the eighth embodiment differs from the projection-type display device 44 of the fourth embodiment solely in the respect that the cone-shaped lens 27 is provided in the vicinity of the second focal point of the elliptical mirror 22, on the front side (lamp 21 side) of the rod integrator 24. The cone-shaped lens 27 is identical to that of the fifth embodiment.

It is therefore possible, by means of the projection-type display device 47 of the eighth embodiment, to increase the brightness of the projected image in the same way as in the fifth embodiment, and, by providing the cone-shaped lens 27, to reduce the nonuniformity in the brightness of the image projected on the screen SC.

NINTH EMBODIMENT

Following is a description, based on FIG. 19 through FIG. 22, of a light-source device 13 according to a ninth embodiment.

Figure 19:
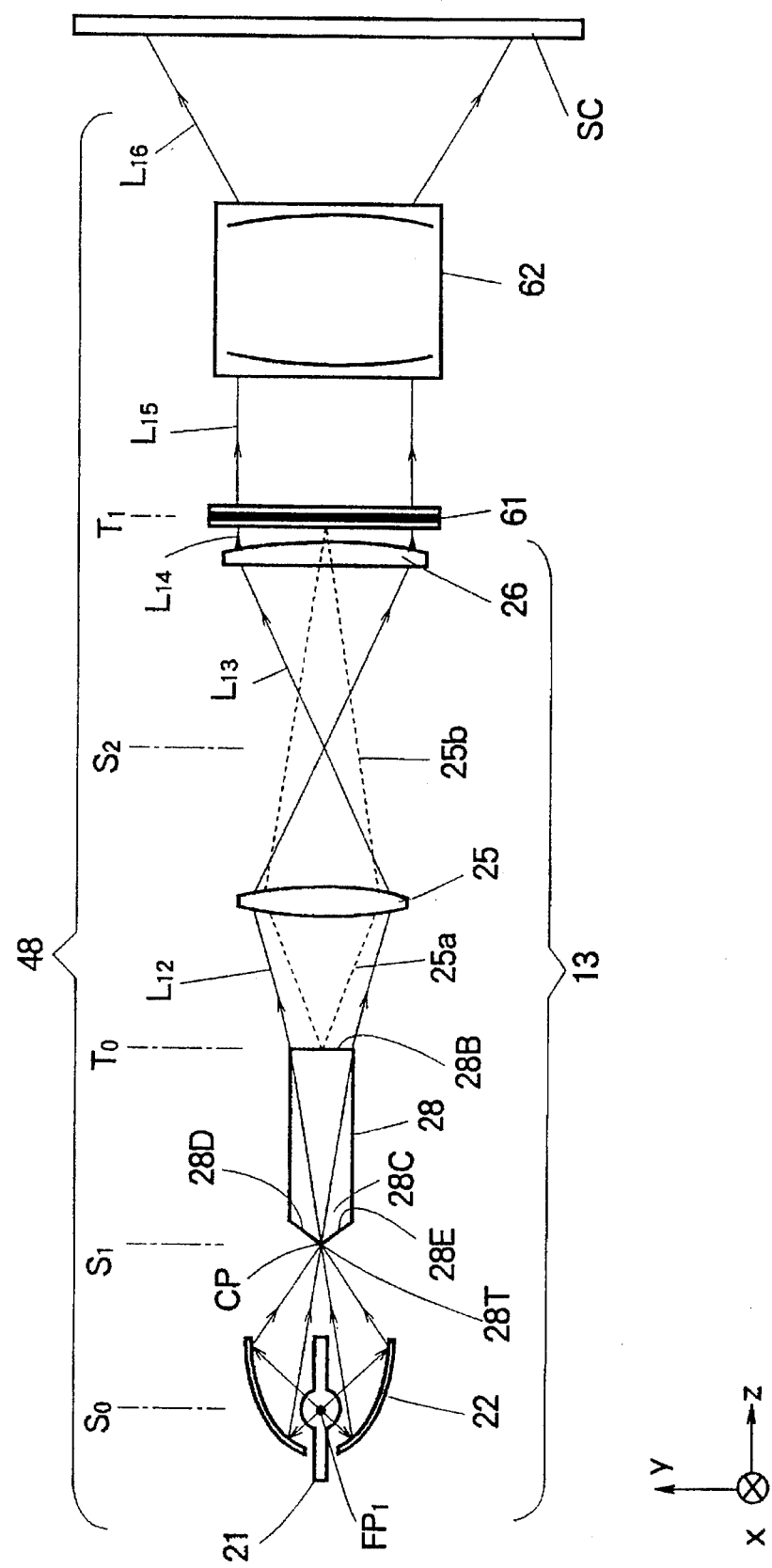
FIG. 19 is a structural drawing showing the general structure of the optical system of a light-source device 13 according to a ninth embodiment and of a projection-type display device 49 according to a tenth embodiment.

FIG. 19 is a structural drawing showing the general structure of the optical system of a light-source device 13 according to the ninth embodiment, and of a projection-type display device 48 incorporating the light-source device 13.

In the light-source device 13 according to the ninth embodiment, those structures that are identical with those of the light-source device 11 of the first embodiment (FIG. 1 through FIG. 3) will be described using the same symbols. The light-source device 13 of the ninth embodiment differs from the light-source device 19 of the first embodiment solely in respect of the configuration of the rod integrator 28. As is shown in FIG. 19, the injection end of the rod integrator 28 of the light-source device 13 is cone-shaped (cone 28C), with an apex 28T protruding toward the lamp 21.

The reason for forming the injection end of the rod integrator 28 into a cone-shaped protuberance is, as was explained in the fifth embodiment based on FIG. 10, is that it both satisfies the requirement for an increase in the uniformity of illuminance of the emitting end 28B and, at the same time, increases the degree of parallelism of light ray $L_{14}$ thereby satisfying the requirement for an increase in the F number of the projection lens 62.

Figure 20:
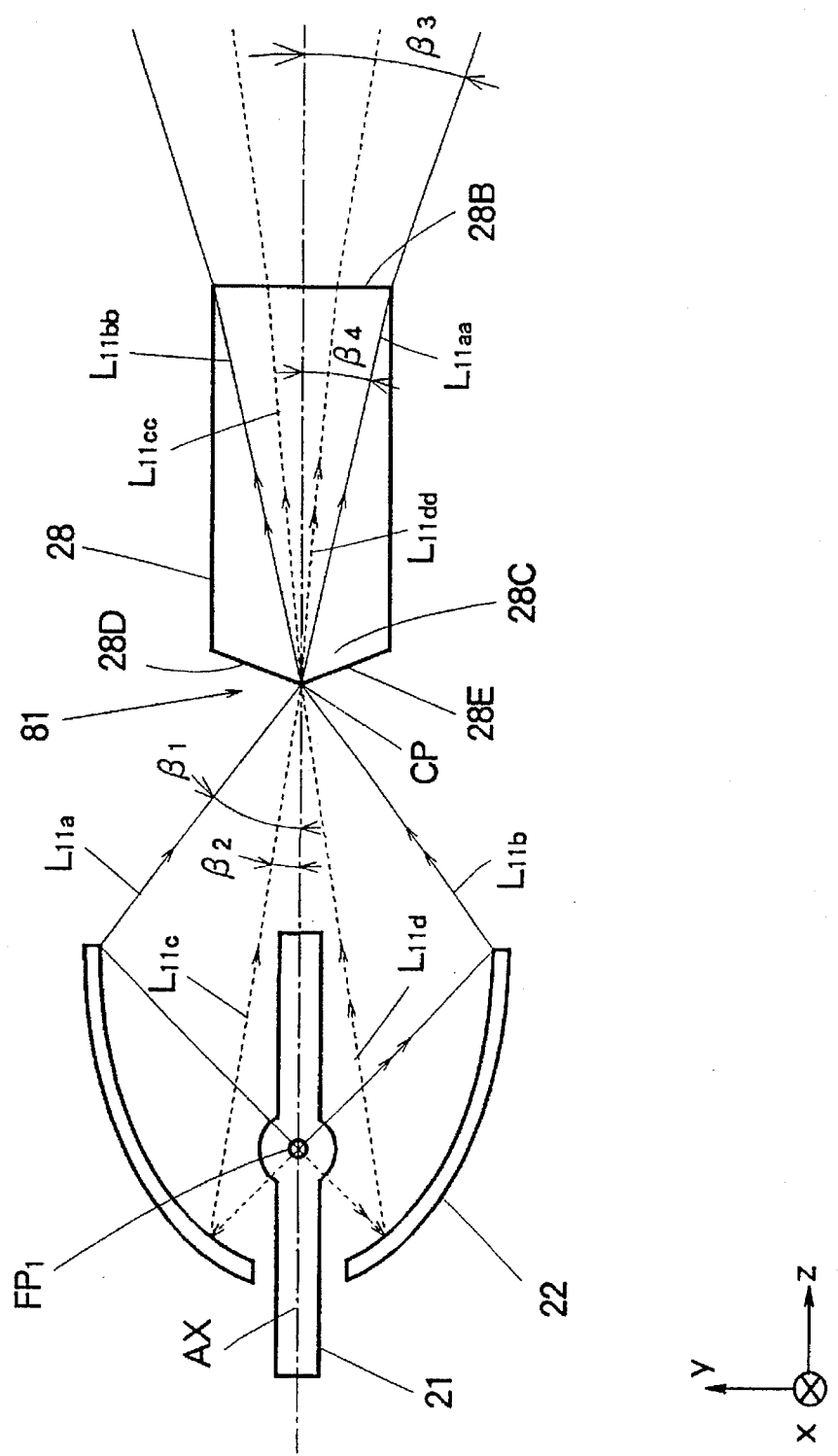
FIG. 20 is an explanatory drawing for the purpose of explaining the function of the rod integrator of the light-source device 13 of the ninth embodiment.
Figure 21:
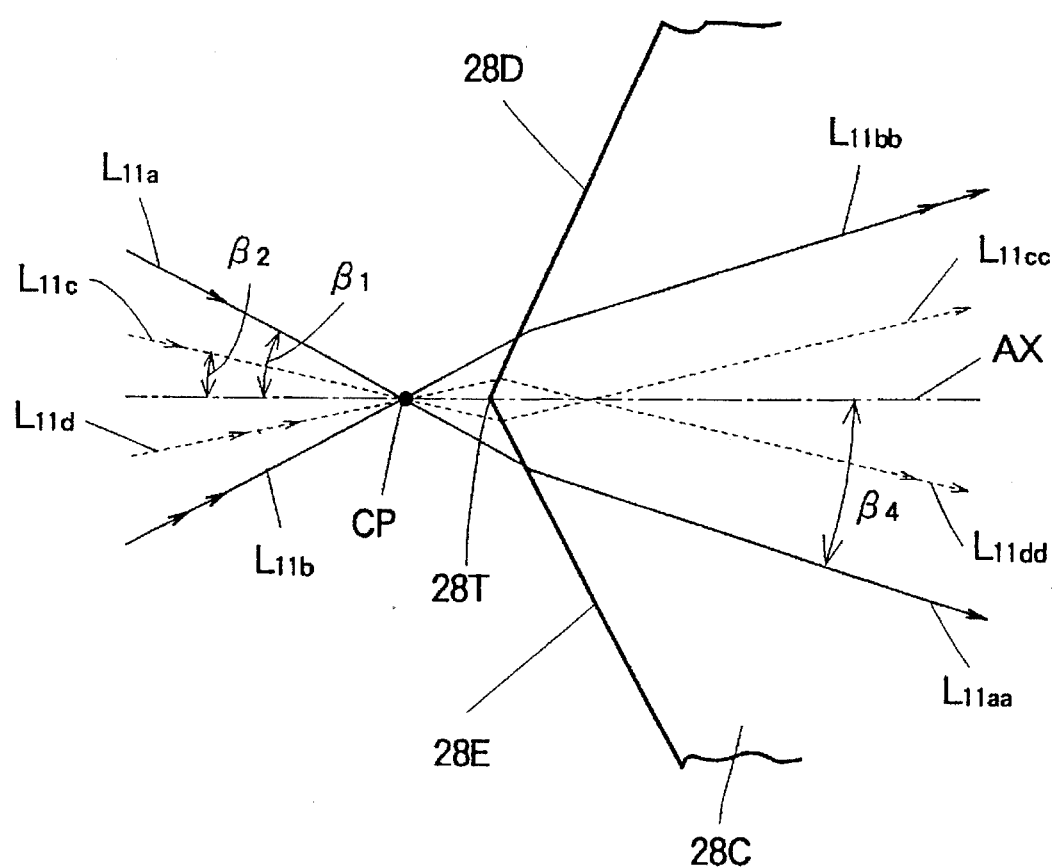
FIG. 21 is an explanatory drawing showing an enlargement of the cone-shaped portion of the rod integrator in FIG. 20.
Figure 22A:
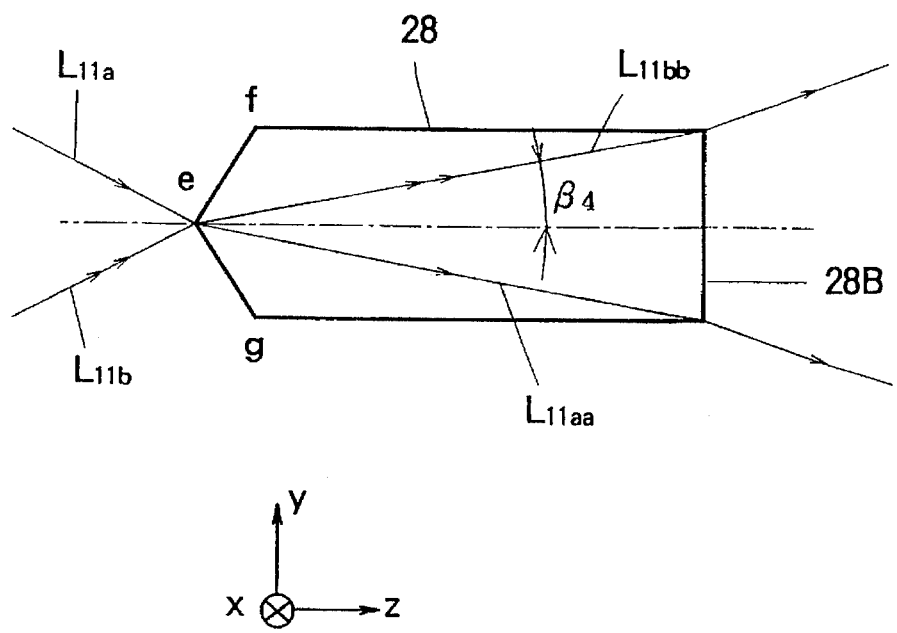
FIGS. 22A and 22B are explanatory drawings for the purpose of explaining the method for optimizing the configuration of the rod integrator in FIG. 20.
Figure 22B:
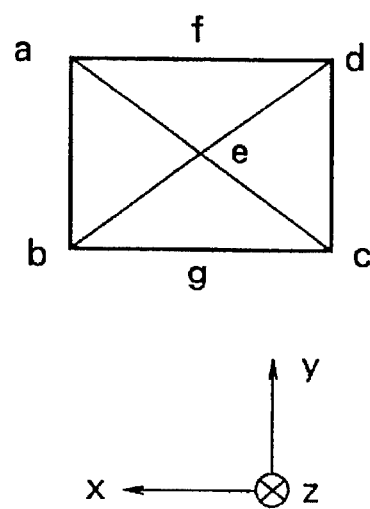

FIG. 20 is an explanatory drawing for the purpose of explaining the function of the rod integrator 28 in the light-source device 13 of the ninth embodiment, and FIG. 21 is an explanatory drawing showing an enlargement of the area around the apex 28T of the cone 28C of the rod integrator 28 (the area designated by reference numeral 81 in FIG. 20).

In FIG. 19 and FIG. 20, convergence point CP is shown as coinciding with the apex 28T of the cone 28C of the rod integrator 28, but in actuality, convergence point CP is located, as is shown in FIG. 21, slightly toward the lamp 21 (in the air) from the apex 28T.

Light ray $L_{11a}$, which impinges on the cone 28 of the rod integrator 28 at an entrance angle $\beta_1$ (from optical axis AX), first passes through convergence point CP located in the air, is refracted by a sloping surface 28E of the cone 28C, and proceeds as light ray $L_{11aa}$ at an emission angle $\beta_4$ (from optical axis AX) that is smaller than entrance angle $\beta_1$. Light ray $L_{11b}$, which impinges on the cone 28C at an entrance angle of $\beta_1$ first passes through convergence point CP located in the air, is refracted by a sloping surface 28D of the cone 28C, and proceeds as light ray $L_{11bb}$ at an emission angle $\beta_4$ that is smaller than entrance angle $\beta_1$.

Light ray $L_{11c}$ (in the optical axis AX direction from the lamp 21 there is a dark area where little luminous flux is emitted and light ray $L_{11c}$ is the dark area boundary light ray from the boundary of the dark area), which impinges on the cone 28C at an entrance angle of $\beta_2$, first passes through convergence point CP located in the air, is refracted by the sloping surface 28E of the cone 28C, and proceeds as light ray $L_{11cc}$ in a direction that intersects optical axis AX (upward in the drawing). Light ray $L_{11d}$ (the dark area boundary light ray), which impinges on the cone 28C at an entrance angle of $\beta_2$ first passes through convergence point CP located in the air, is refracted by the sloping surface 28D of the cone 28C, and proceeds as light ray $L_{11dd}$ in a direction that intersects optical axis AX (downward in the drawing).

In this way, the luminous flux between incident light rays $L_{11a}$ and $L_{11c}$ impinges on the rod integrator 28 and becomes the luminous flux between emitted light rays $L_{11aa}$ and $L_{11cc}$. Similarly, the luminous flux between incident light rays $L_{11b}$ and $L_{11d}$ impinges on rod integrator 28 and becomes the luminous flux between emitted light rays $L_{11bb}$ and $L_{11dd}$.

Since, as can be seen, the luminous flux within rod integrator 28 overlaps in the vicinity of optical axis AX, it is possible to increase the illuminance in the direction of optical axis AX, even when the lamp 21 is a discharge lamp the discharge electrode of which is disposed in parallel with optical axis AX. Thus it is possible to reduce nonuniformity in illuminance even without increasing the number of imaginary light-source images, as was the case in the first embodiment.

Since providing the rod integrator 28 with the cone 28C reduces the angle $\beta_4$ to optical axis AX formed by the luminous flux, it is possible to reduce the number of imaginary light-source images caused by total reflection at the side surfaces of the rod integrator 28 and decrease the size of the secondary light-source images. For example in FIG. 22, which shows one example of preferred design conditions for the rod integrator 28, it the design is such that outermost light ray $L_{11aa}$ coincides with an edge of the emitting end 28B of the rod integrator 28 and outermost light ray $L_{11bb}$ coincides with an edge of the emitting end 28B of the rod integrator 28, The size of the secondary light-source images can be reduced. In this case the degree of parallelism of the luminous flux impinging on the liquid-crystal panel 61 can be trap roved, and at the same time the F number of the projection lens 62 can be increased.

In order to reduce to the minimum emission angle $\beta_4$ of the outermost light ray $L_{11aa}$ (or $L_{11bb}$), it is desirable that the design be such that the relationship between the emission angle $\beta_4$ and the angle of convergence $(\beta_1-\beta_2)$ formed between dark boundary light ray $L_{11c}$ and outermost light ray $L_{11a}$ (or between dark boundary light ray $L_{11d}$ and outermost light ray $L_{11b}$) incident to the cone 28C be expressed by $$\beta_4 + (\beta_1 - \beta_2)/2n \qquad (2)$$

where n is the refractive index of the rod integrator 28.

This condition is identical to that relating to the relationship of angle $\beta_3$ (FIG. 20) formed by the luminous flux emitted from the rod integrator 28, expressed by $$\beta_3 \div (\beta_1 - \beta_2)/2 \quad (3)$$

When the emission angle $\beta_3$ is to be decreased, it is desirable, considering the fact that the intensity of light ray $L_{11a}$ is greater than the intensity of light ray $L_{11c}$, that the design be such that the angle formed between light ray $L_{11cc}$ and optical axis AX be larger than the angle formed between light ray $L_{11aa}$, which impinges on the rod integrator 28, and the optical axis AX.

Further, although the pillar and cone of the rod integrator 28 of FIG. 19 are of unitary formation, it is equally possible for the pillar and cone to be formed separately and joined.

TENTH EMBODIMENT

Following is a description, based on FIG. 19, of a projection-type display device 48 according to a tenth embodiment.

As is shown in FIG. 19, the projection-type display device 48 according to the tenth embodiment comprises, in addition to the light-source device 13 of the ninth embodiment, a liquid-crystal panel 61 that functions as a light valve for image formation and the projection lens 62. Here the liquid-crystal panel 61 and the projection lens 62 are identical to those of the second embodiment.

Also, in the projection-type display device 48 according to the tenth embodiment, as is shown in FIG. 4, image display area 70 of the liquid-crystal panel 61 is illuminated by a luminous flux of a cross-sectional configuration that is analogous to the image display area 70 and slightly larger in size, so that the amount of luminous flux that makes no contribution to projecting the image on the screen SC (shown by cross-hatched area 71) can be almost entirely eliminated. It is therefore possible, by means of the projection-type display device 48 of the tenth embodiment, to reduce the loss of luminous flux emitted from the lamp 21, thereby increasing the brightness of the projected image.

Further, through the provision of the rod integrator 28 comprising the cone 28C, the emitting end 28B of the rod integrator 28 is at a highly uniform illuminance and the image display area of the liquid-crystal panel 61 is also uniformly illuminated, so that it is possible to reduce non-uniformities in the brightness of the image projected on the screen SC.

ELEVENTH EMBODIMENT

Figure 23:
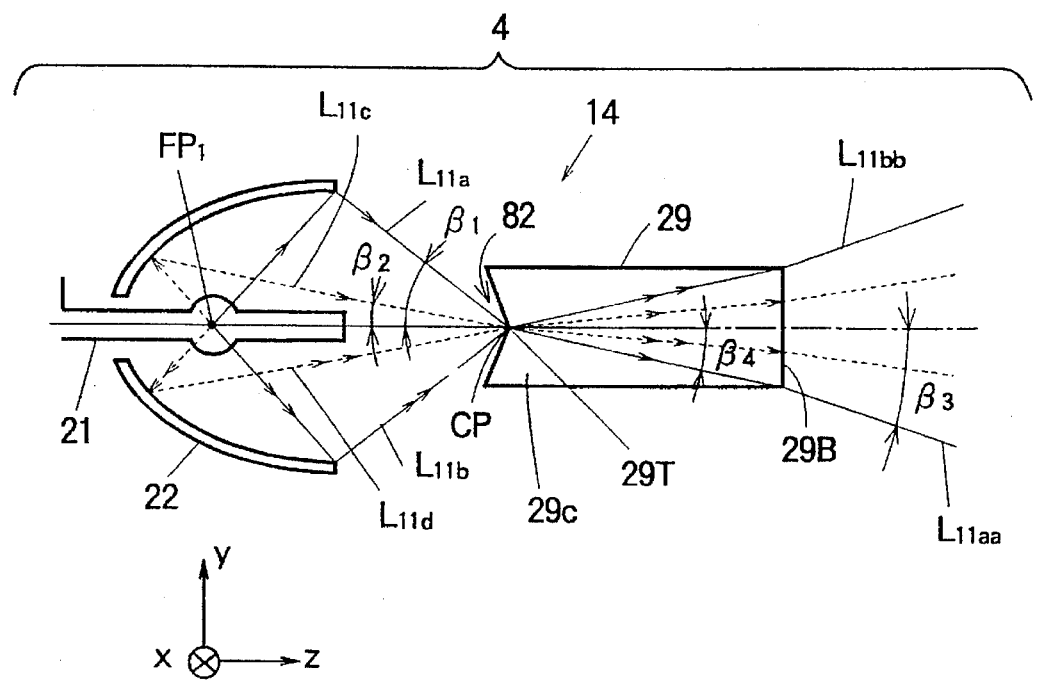
FIG. 23 is an explanatory drawing for the purpose of explaining the function of the rod integrator of a light-source device 14 according to an eleventh embodiment.
Figure 24:
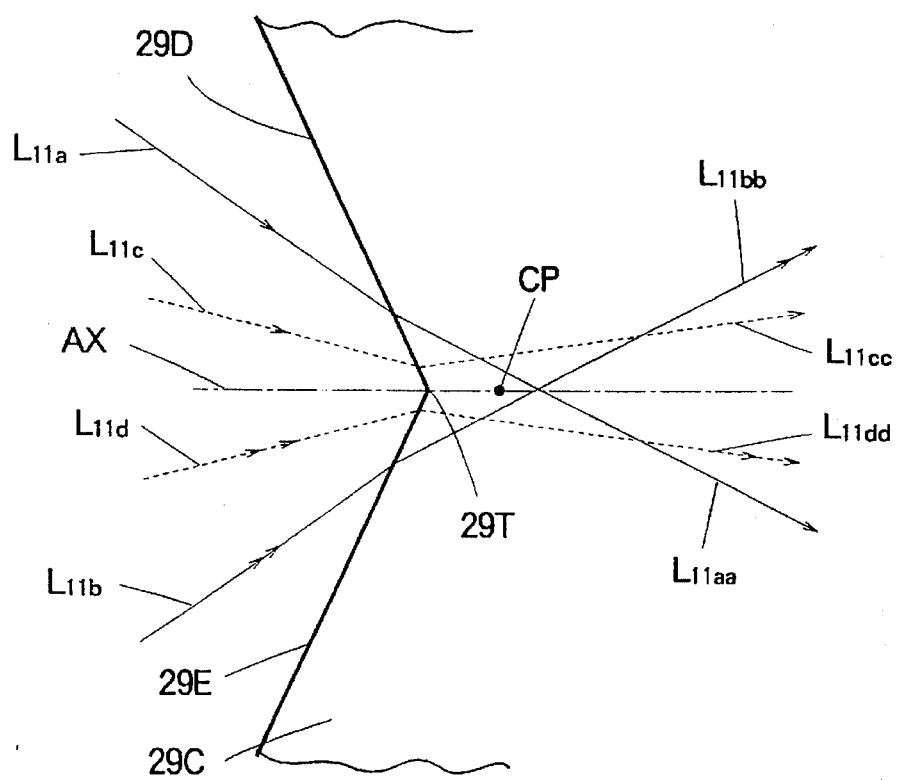
FIG. 24 is an explanatory drawing showing a magnification of the vicinity of the cone-shaped indentation of the rod integrator in FIG. 23.

Following is a description, based on FIG. 23 and FIG. 24, of a light-source device 14 according to an eleventh embodiment.

FIG. 23 is an explanatory drawing showing the function of a rod integrator 29 of the light-source device 14 according to the eleventh embodiment, and FIG. 24 is an explanatory drawing showing a magnification of the vicinity of an apex 29T of a cone-shaped indentation 29C.

In FIG. 23, convergence point CP is shown as coinciding with the apex 29T of the cone-shaped indentation 29C, but in actuality, convergence point CP is located, as is shown in FIG. 24, slightly toward the emitting end 29B (within the rod integrator 29) from the apex 29T.

As is shown in FIG. 24, light ray $L_{11a}$, which impinges in the direction of convergence point CP within the cone-shaped indentation 29C of the rod integrator 29 at an entrance angle $\beta_1$ (from optical axis AX), is refracted by a sloping surface 29D of the cone-shaped indentation 29C, and proceeds as light ray $L_{11aa}$ at an emission angle $\beta_4$ (from optical axis AX) that is smaller than entrance angle $\beta_1$ Light ray $L_{11b}$, which impinges in the direction of convergence point CP within the cone-shaped indentation 29C of the rod integrator 29 at an entrance angle $\beta_1$ (from optical axis AX), is refracted by a sloping surface 29E of the cone-shaped indentation 29C, and proceeds as light ray $L_{11aa}$ at an emission angle $\beta_4$ (from optical axis AX) that is smaller than entrance angle $\beta_1$.

Light ray $L_{11c}$ (in the optical axis AX direction from the lamp 21 there is a dark area where little luminous flux is emitted and light ray $L_{11c}$ is the dark area boundary light ray from the boundary of the dark area), which impinges In the direction of convergence point CP on sloping surface 29D of the cone-shaped indentation 29C at entrance angle $\beta_1$ is refracted by sloping surface 29D of the cone-shaped indentation 29C and proceeds as light ray $L_{11cc}$ in an upward direction In the drawing. Light ray $L_{11d}$ (the dark area boundary light ray), which impinges in the direction of convergence point CP on sloping surface 29E of the cone-shaped indentation 29C at an entrance angle $\beta_2$ is refracted by a sloping surface 28E of the cone-shaped indentation 29C and proceeds as light ray $L_{11cc}$ in a downward direction in the drawing.

In this way, the luminous flux between incident light rays $L_{11a}$ and $L_{11c}$ impinges on the rod integrator 29 and becomes the luminous flux between light rays $L_{11aa}$ and $L_{11cc}$. Similarly, the luminous flux between incident light rays $L_{11b}$ and $L_{11d}$ impinges on the rod integrator 29 and becomes the luminous flux between emitted light rays $L_{11bb}$ and $L_{11dd}$.

Since, as can be seen, the luminous flux within the rod integrator 29 overlaps in the vicinity of optical axis AX, it is possible to increase the illuminance in the direction of optical axis AX, even when the lamp 21 is a discharge lamp the discharge electrode of which is disposed in parallel with optical axis AX. Thus it is possible to reduce nonuniformity in illuminance even without increasing the number of imaginary light-source images, as was the case in the first embodiment.

Further, since providing the rod integrator 28 with cone-shaped indentation 29C reduces the angle $\beta_4$ to optical axis AX formed by the luminous flux, it is possible to reduce the number of imaginary light-source images caused by total reflection at the side surfaces of the rod integrator 29 and decrease the size of the secondary light-source images. For example, in FIG. 23, if the design is such that outermost light ray $L_{11aa}$ coincides with an edge of the emitting end 29B of the rod integrator 29 and outermost light ray $L_{11bb}$ coincides with an edge of the emitting end 29B of the rod integrator 29, the size of the secondary light-source images can be reduced. In this case the degree of parallelism of the luminous flux impinging on the liquid-crystal panel 61 can be improved, and at the same time the F number of projection lens 62 can be increased.

TWELFTH EMBODIMENT

Figure 25:
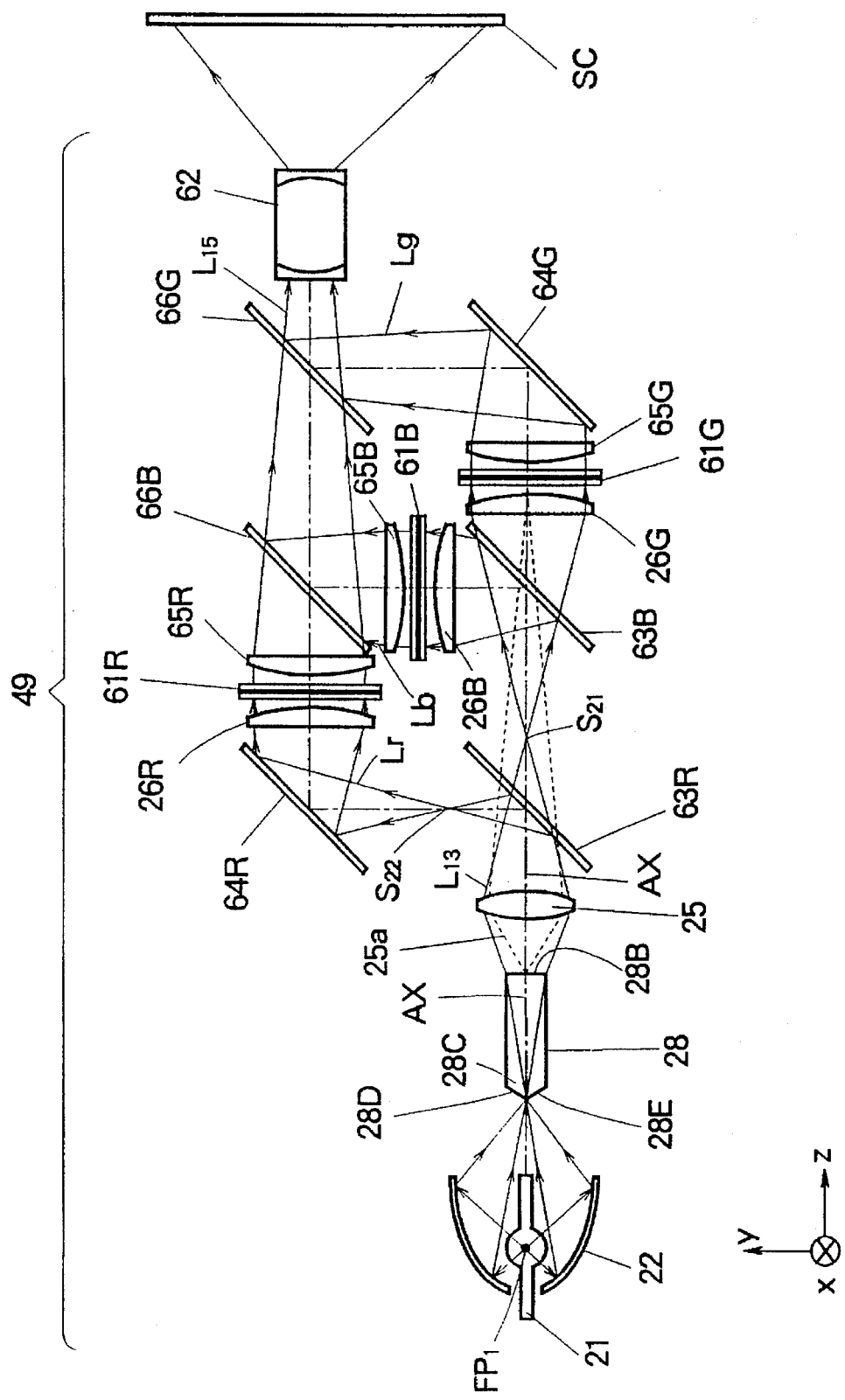
FIG. 25 is a structural drawing showing the general structure of the optical system of a projection-type display device 49 according to a twelfth embodiment.

Following is a description, based on FIG. 25, of a projection-type display device 49 according to a twelfth embodiment.

FIG. 25 is a structural drawing showing the general structure of the optical system of projection-type display device 49 capable of displaying a color image, according to the twelfth embodiment.

In the projection-type display device 49 according to the twelfth embodiment, those structures that are identical with those of the projection-type display device 43 of the third embodiment (FIG. 7) will be described using the same symbols. The projection-type display device 49 according to the twelfth embodiment differs from the projection-type display device 43 of the third embodiment solely in the respect that the cone 28C is provided on the front side (lamp 21 side) of the rod integrator 28. The rod integrator 28 is identical to that of the ninth embodiment.

Also, in the projection-type display device 49 according to the twelfth embodiment, as is shown in FIG. 4, image display area 70 of the liquid-crystal panel 61 is illuminated by a luminous flux of a cross-sectional configuration that is analogous to the image display area 70 or slightly larger in size, so that the amount of luminous flux that makes no contribution to projecting the image on screen SC (shown by cross-hatched area 71) can be almost entirely eliminated. It is therefore possible, by means of the projection-type display device 49 of the twelfth embodiment, to reduce the loss of luminous flux emitted from the lamp 21, thereby increasing the brightness of the projected image.

Further, the emitting end 28B of the rod integrator 28 is at a highly uniform 1lluminance and the image display area of the liquid-crystal panel 61 is also uniformly illuminated, so that it is possible to reduce nonuniformities in the brightness of the image projected on the screen SC.

THIRTEENTH EMBODIMENT

Figure 26:
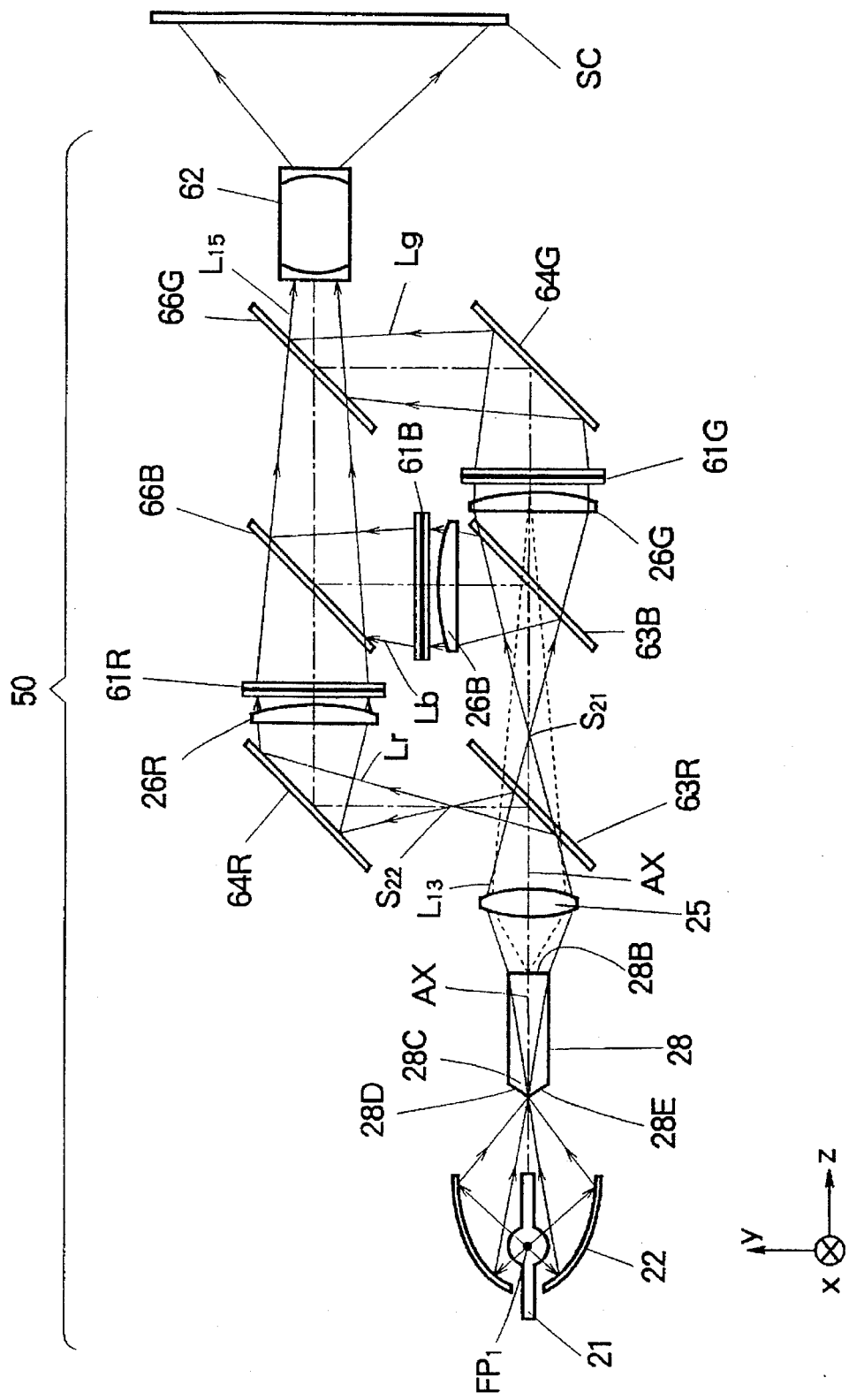
FIG. 26 is a structural drawing showing the general structure of the optical system of a projection-type display device according to a thirteenth embodiment.
Figure 27:
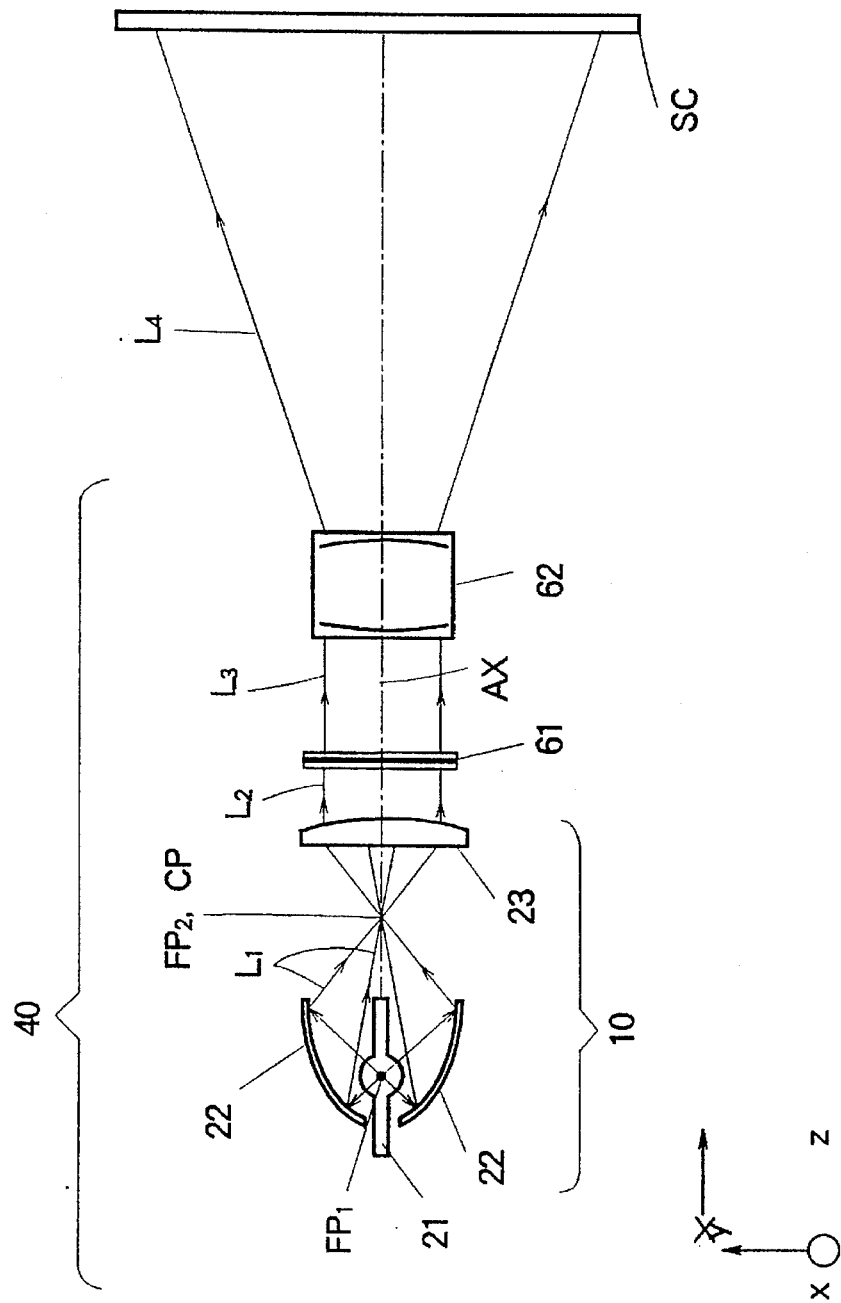
FIG. 27 is a structural drawing showing the general structure of the optical system of a projection-type display device 40 and a light-source device 10 according to the prior art.
Figure 28:
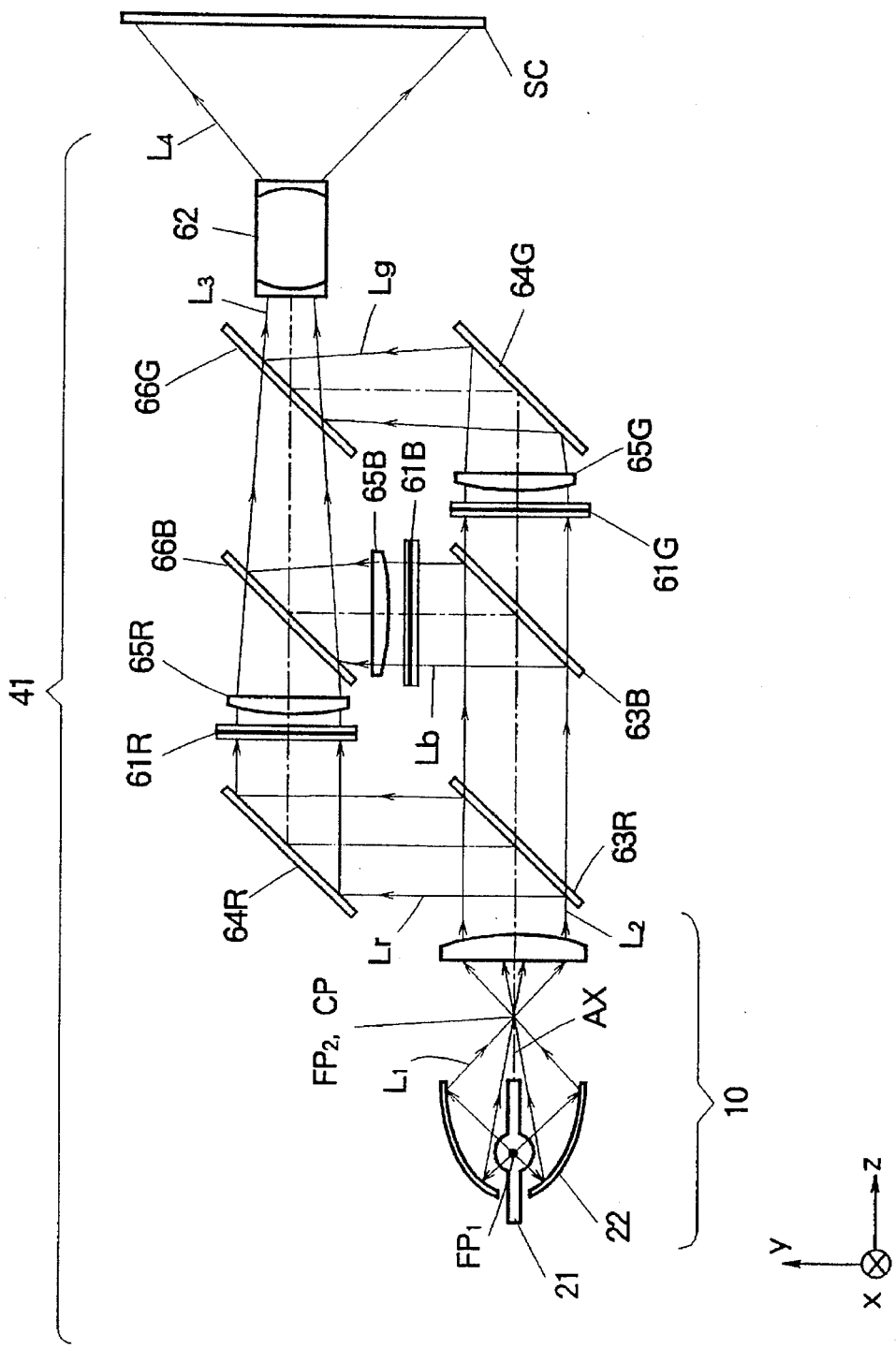
FIG. 28 is a structural drawing showing the general structure of the optical system of a projection-type display device 41 according to prior art, capable of magnifying and displaying a color picture image.

Following is a description, based on FIG. 26, of a projection-type display device 50 according to a thirteenth embodiment.

FIG. 26 is a structural drawing showing the general structure of the optical system of the projection-type display device 50 capable of displaying a color image, according to the thirteenth embodiment.

In the projection-type display device 50 of the thirteenth embodiment, those structures that are identical with those of the projection-type display device 44 of the fourth embodiment (FIG. 8) will be described using the same symbols. The projection-type display device 50 according to the thirteenth embodiment differs from the projection-type display device 44 of the fourth embodiment solely in the respect that cone 28C is provided on the front side (lamp 21 side) of the rod integrator 28. The rod integrator 28 is identical to that of the ninth embodiment.

Also, in projection-type display device 50 according to the thirteenth embodiment, as is shown in FIG. 4, image display area 70 of the liquid-crystal panel 61 is illuminated by a luminous flux of a cross-sectional configuration that is analogous to the image display area 70 and slightly larger in size, so that the amount of luminous flux that makes no contribution to projecting the image on the screen SC (shown by cross-hatched area 71) can be almost entirely eliminated. It is therefore possible, by means of the projection-type display device 50 of the thirteenth embodiment, to reduce the loss of luminous flux emitted from lamp 21, thereby increasing the brightness of the projected image.

Further, the emitting end 28B of the rod integrator 28, which comprises the cone 28C, is at a highly uniform illuminance and the image display area of the liquid-crystal panel 61 is also uniformly illuminated, so that it is possible to reduce nonuniformities in the brightness of the image projected on the screen SC.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A projection-type display device having only one light integrator, said projection-type display device comprising:

the light integrator, consisting of a pillar optical element having an injection end and an emitting end;

a lamp;

condensing means for condensing light emitted by said lamp in the vicinity of said injection end;

first lens means for forming an image of said emitting end;

a light valve for receiving the image of said emitting end from said first lens means and for forming a picture image on a surface having an image display area; and projection lens means for magnifying and projecting the picture image displayed by said light valve;

said emitting end receiving superimposed illumination from said lamp and a plurality of virtual light sources and having a cross-sectional configuration analogous to said image display area of said light valve such that the superimposed illumination substantially matches said image display area after passing through said first lens means, said light valve being disposed in the vicinity of a conjugate surface, and said emitting end and said conjugated surface having a conjugate relationship with each other.

2. The projection-type display device of claim 1, wherein said pillar optical element is a pillar, the injection end and emitting end of which are rectangular, and wherein luminous flux impinging on said pillar optical element from the injection end is totally reflected from side surfaces of said pillar optical element and led to said emitting end.

3. The projection-type display device of claim 1, wherein dimensions of the image of said emitting end formed by said first lens means is approximately the same as, or larger than, said image display area of said light valve.

4. The projection-type display device of claim 1, further comprising second lens means provided near the lamp side of said light valve, said second lens means rendering the incident luminous flux from said emitting end parallel.

5. The projection-type display device of claim 1, further comprising third lens means provided in the vicinity of said light valve, said third lens means re-forming, in the vicinity of an entrance pupil of said projection lens, the image of said lamp that was formed by said first lens means.

6. A projection-type display device having only one light integrator, said projection-type display device comprising:

the light integrator, consisting of a pillar optical element having an injection end and an emitting end;

a lamp;

condensing means for condensing light emitted by said lamp;

first lens means for forming an image of said emitting end;

analyzing means for analyzing, into a red component, a green component and a blue component, the light that has been emitted from said emitting end and has passed through said first lens means;

a first light valve for forming a picture image for the red component light on a surface having a first image display area;

a second light valve for forming a picture image for the green component light on a surface having a second image display area;

a third light valve for forming a picture image for the blue component light on a surface having a third display area;

synthesizing means for superimposing the red component light, green component light and blue component light that has passed through said first through third light valves, respectively;

projection lens means for magnifying and projecting the displayed picture image synthesized by said synthesizing means from said first through third light valves said emitting end receiving superimposed illumination from said lamp and a plurality of virtual light sources and having a cross-sectional configuration analogous to said image display area of said light valve such that the superimposed illumination substantially matches said first, second and third image display areas after passing through said first lens means and said analyzing means;

said first, second and third light valves being disposed in the vicinity of first, second and third conjugate surfaces, respectively;

and said emitting end having respective conjugate relationships with the first, second and third conjugate surfaces.

7. A light-source device comprising:

a pillar optical element having an injection end and an emitting end;

a lamp;

a condensing means for condensing light emitted by said lamp;

cone-shaped deflection means for deflecting luminous flux from said condensing means and injecting the luminous flux to said injection end; and first lens means for forming an image of said emitting end;

wherein said cone-shaped deflection means is disposed in the vicinity of a convergence point of the luminous flux condensed by said condensing means, wherein in that said injection end is disposed immediately to the rear of said cone-shaped deflection means, and wherein the image of said emitting end is formed by said first lens means on a surface to be illuminated.

8. The light-source device of claim 7, wherein said pillar optical element is a pillar, the injection end and emitting end of which are rectangular, and wherein the outermost light ray of the emitted light deflected by said deflection means passes though an area including the emitting end in a plane that includes the diagonal of the emitting end.

9. The light-source device of claim 7, wherein said cone-shaped deflection means has a configuration that is anisotropic to an angle of emission in accordance with the cross-sectional configuration of said pillar optical element.

10. The light-source device of claim 7, wherein a second lens means is provided near the lamp side of said surface to be illuminated, said second lens means rendering the incident luminous flux from said emitting end parallel.

11. A projection-type display device comprising:

a pillar optical element having an injection end and an emitting end;

a lamp;

condensing means for condensing light emitted by said lamp;

cone-shaped deflecting means for deflecting luminous flux from said condensing means and injecting the luminous flux into said injection end;

first lens means for forming an image of said emitting end;

a light valve for forming a picture image on a surface having an image display area; and projection lens means for magnifying and projecting the picture image displayed by said light valve;

wherein the image of the emitting end is formed by said first lens means on said image display area.

12. The projection-type display device of claim 11, wherein said pillar optical element is a pillar, the injection end and emitting end off which are rectangular, and wherein the outermost light ray of the emitted light deflected by said deflection means passes though an area including the emitting end in a plane that includes the diagonal of the emitting end.

13. The projection-type display device of claim 11, wherein said pillar optical element is a pillar, the injection end and emitting end of which are rectangular, and wherein the configuration of said emitting end is analogous to that of the image display area of said light valve.

14. The projection-type display device of claim 11, wherein the dimensions off the image on the emitting end formed by said first lens means are approximately the same as, or larger than, the image display area of said light valve.

15. The projection-type display device of claim 11, further comprising second lens means provided near the lamp side of said light valve, said second lens means rendering the incident luminous flux from said emitting end parallel.

16. The projection-type display device of claim 11, further comprising third lens means provided in the vicinity of said light valve, said third lens means re-forming, in the vicinity of an entrance pupil of said projection lens, the image of said lamp that was formed by said first lens means.

17. A projection-type display device comprising:

a pillar optical element having an injection end and an emitting end;

a lamp;

condensing means for condensing light emitted by said lamp in the vicinity of said injection end;

cone-shaped deflection means for deflecting the luminous flux from said condensing means and injecting the luminous flux into said injection end;

first lens means for forming an image of said emitting end;

analysing means for analysing, into a red component, a green component and a blue component, the light that has been emitted from the emitting end of said pillar optical element and has passed through said first lens means;

a first light valve for forming a picture image for the red component light on a first image display area;

a second light valve for forming a picture image for the green component light on a second image display area;

a third light valve for forming a picture image for the blue component light on a third image display area;

synthesizing means for superimposing the red component light, green component light and blue component light that has passed said first through third light valves, respectively; and projection lens means for magnifying and projecting the displayed picture image synthesized by said synthesizing means from said first through third light valves.

18. A light-source device comprising:

a pillar optical element having an injection end and an emitting end;

a lamp;

condensing means for condensing light emitted by said lamp; and first lens means for forming an image of said emitting end;

wherein said pillar optical element has the injection end that is cone-shaped and the emitting end that is planar, and that the injection end of said pillar optical element is disposed in the vicinity of the convergence point of the luminous flux condensed by said condensing means, and wherein the image of the emitting end of said pillar optical element is formed by said first lens means on a surface to be illuminated.

19. The light-source device of claim 18, wherein said pillar optical element has an injection end that forms a cone-shaped indentation.

20. The light-source device of claim 18, wherein said pillar optical element has the injection end that forms a cone-shaped protuberance.

21. The light-source device of claim 18, wherein said pillar optical element is a pillar, the emitting end of which is rectangular, and wherein the outermost light ray of the light deflected by said cone-shaped injection end passes though an area including said emitting end in a plane that includes the diagonal to said emitting end.

22. The light-source device of claim 18, wherein the cone-shaped injection end of said pillar optical element is anisotropic in accordance with configuration of the emitting end of said pillar optical element.

23. The light-source device of claim 18, further comprising second lens means provided near the lamp side of said light valve, said second lens means rendering the incident luminous flux from said emitting end parallel.

24. A projection-type display device comprising:
   a pillar optical element having an injection end and an emitting end;
   a lamp;
   condensing means for condensing light emitted by said lamp;
   first lens means for forming an image of said emitting end;
   a light valve for forming a picture image on a surface having an image display area; and
   projection lens means for magnifying and projecting the picture image displayed by said light valve;
   wherein said pillar optical element has an injection end that is cone-shaped and an emitting end that is planar, and the injection end of said pillar optical element is disposed in the vicinity of a convergence point of the luminous flux condensed by said condensing means, and wherein the image of the emitting end of said pillar optical element is formed by said first lens means in the image display area of said light valve.

25. The projection-type display device of claim 24, wherein said pillar optical element has the injection end that forms a cone-shaped protuberance.

26. The projection-type display device of claim 24, wherein said pillar optical element has the injection end that forms a cone-shaped indentation.

27. The projection-type display device of claim 24, wherein said pillar optical element has the emitting end that is rectangular, and, wherein the outermost light ray of the luminous flux deflected by the cone-shaped injection end of said pillar optical element passes though an area including the emitting end of said pillar optical element in a plane that includes the diagonal to said emitting end.

28. The projection-type display device of claim 24, wherein said pillar optical element has an emitting end that is rectangular, and wherein the configuration of said emitting end is analogous to that of the image display area of said light valve.

29. The projection-type display device of claim 24, wherein the dimensions of the image on the emitting end formed by the first lens means are approximately the same as, or larger than, the image display area of said light valve.

30. The projection-type display device of claim 24, further comprising second lens means provided near the lamp side of said light valve, said second lens means rendering the incident luminous flux from said emitting end parallel.

31. The projection-type display device of claim 24, further comprising third lens means provided in the vicinity of said light valve, said third lens means re-forming, in the vicinity of an entrance pupil of said projection lens, the image of said lamp that was formed by said first lens means.

32. A projection-type display device comprising:
   a pillar optical element having an injection end and an emitting end;
   a lamp;
   condensing means for condensing light emitted by said lamp in the vicinity of the injection end of said pillar optical element;
   first lens means for forming an image of the emitting end of said pillar optical element;
   analysing means for analysing, into a red component, a green component and a blue component, the light that has been emitted from the emitting end off said pillar optical element and has passed through said first lens means;
   a first light valve for forming a picture image for the red component light on a surface having a first image display area;
   a second light valve for forming a picture image for the green component light on a surface having a second image display area;
   a third light valve for forming a picture image for the blue component light on a surface having a third image display area;
   synthesizing means for superimposing the red component light, green component light and blue component light that has passed said first through third light valves, respectively; and
   projection lens means for magnifying and projecting the displayed picture image synthesized by said synthesizing means from said first through third light valves;
   wherein said pillar optical element has the injection end that is cone-shaped and the emitting end that is planar, and that the injection end of said pillar optical element is disposed in the vicinity of a convergence point of the luminous flux condensed by said condensing means, and wherein the image of the emitting end of said pillar optical element is formed by said first lens means in the image display area within the surface of said light valve.

33. A projection-type display device comprising:
   a pillar optical element having an injection end and an emitting end;
   a lamp;
   condensing means for condensing light emitted by said lamp;
   first lens means for forming an image of the emitting end of said pillar optical element;
   a light valve for forming a picture image on a surface comprising an image display area; and
   projection lens means for projecting and magnifying the image displayed by said light valve;
   wherein said pillar optical element comprises a plurality of pillar optical elements having emitting ends of various configurations, with a switching means so that the desired pillar optical element may be disposed in the optical path in accordance with the image display area of said light valve.

34. The projection-type display device of claim 33, further comprising cone-shaped deflection means disposed in the lamp side of the injection end of said pillar optical element for the purpose of deflecting the luminous flux.

35. The projection-type display device of claim 33, wherein the injection end of said pillar optical element is cone-shaped.

36. The projection-type display device of claim 35, wherein the injection end of said pillar optical element has a cone-shaped indentation.

37. The projection-type display device of claim 35, wherein the injection end of said pillar optical element has a cone-shaped protuberance.

38. A light-source apparatus comprising:

a lamp;

condensing means for condensing light emitted by said lamp;

a first pillar optical element having an injection end and an emitting end;

a second pillar optical element different than said first pillar optical element, said second pillar optical element having an injection end and an emitting end;

selecting means for selecting one of said first or second pillar optical elements and disposing the selected pillar optical element in the optical path of condensed light from said condensing means; and first lens means for forming an image of the emitting end of the selected pillar optical element.

39. The light source apparatus of claim 38, further comprising cone-shaped deflection means for deflecting luminous flux, said cone-shaped deflection means being disposed on the injection end of the selected pillar optical element.

40. The light source apparatus of claim 38, wherein the injection end of said first or second pillar optical element is cone-shaped and the emitting end is planar, wherein the injection end of the selected pillar optical element is disposed in the vicinity of a convergence point of luminous flux condensed by said condensing means, and wherein the image of the emitting end of the selected pillar optical element is formed by said first lens means on a surface to be illuminated.

41. The light source apparatus of claim 38, wherein the injection end of said first or second pillar optical element has a cone-shaped indentation.

42. The light source apparatus of claim 38, wherein the injection end of said first or second pillar optical element has a cone-shaped protuberance.

43. A projection-type display device comprising:

a lamp;

condensing means for condensing light emitted by said lamp;

a first pillar optical element having an injection end and an emitting end;

a second pillar optical element different than said first pillar optical element, said second pillar optical element having an injection end and an emitting end;

selecting means for selecting one of said first or second pillar optical elements and disposing the selected pillar optical element in the optical path of condensed light from said condensing means;

first lens means for forming an image of the emitting end of the selected pillar optical element;

analysing means for analysing, into a red component, a green component and a blue component, the light that has been emitted from the emitting end of said selected pillar optical element and has passed through said first lens means;

a first light valve for forming a picture image for the red component light on a first image display area;

a second light valve for forming a picture image for the green component light on a second image display area;

a third light valve for forming a picture image for the blue component light on a third image display area;

synthesizing means for superimposing the red component light, green component light and blue component light that has passed said first through third light valves, respectively; and projection lens means for magnifying and projecting the displayed picture image synthesized by said synthesizing means from said first through third light valves.

44. The projection-type display apparatus of claim 43, further comprising cone-shaped deflection means for deflecting luminous flux, said cone-shaped deflection means being disposed on the injection end of the selected pillar optical element.

45. The projection-type display apparatus of claim 43, wherein the injection end of said first or second pillar optical element is cone-shaped and the emitting end is planar, wherein the injection end of the selected pillar optical element is disposed in the vicinity of a convergence point of luminous flux condensed by said condensing means, and wherein the image of the emitting end of the selected pillar optical element is formed by said first lens means on a surface to be illuminated.

46. The projection-type display apparatus of claim 43, wherein the injection end of said first or second pillar optical element has a cone-shaped indentation.

47. The projection-type display apparatus of claim 43, wherein the injection end of said first or second pillar optical element has a cone-shaped protuberance.

* * * * *

UNITED STATES PATENT AND TRADEMARK OFFICE
CERTIFICATE OF CORRECTION

PATENT NO. : 5,634,704
DATED : June 3, 1997
INVENTOR(S) : Shinsuke SHIKAMA et al.

It is certified that error appears in the above-indentified patent and that said Letters Patent is hereby corrected as shown below:

Column 23, line 7, insert ";" after "valves".

Column 23, line 7, "said (second occurrence)" should begin on line 8.

Column 24, line 5, "off" should be changed to --of--.

Column 24, line 16, "off" should be changed to --of--.

Signed and Sealed this

Fourteenth Day of October, 1997

Attest:

BRUCE LEHMAN

*Attesting Officer*  *Commissioner of Patents and Trademarks*